United States Patent
Matsui et al.

(10) Patent No.: US 10,873,109 B2
(45) Date of Patent: Dec. 22, 2020

(54) SECONDARY BATTERY, BATTERY PACK, ELECTRIC VEHICLE, ELECTRIC POWER STORAGE SYSTEM, ELECTRIC TOOL, AND ELECTRONIC APPARATUS

(71) Applicant: MURATA MANUFACTURING CO., LTD., Kyoto (JP)

(72) Inventors: Takaaki Matsui, Kyoto (JP); Takashi Kokubun, Kyoto (JP); Kazuki Honda, Kyoto (JP); Taichi Kogure, Kyoto (JP); Naoko Yamakawa, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 155 days.

(21) Appl. No.: 15/993,919

(22) Filed: May 31, 2018

(65) Prior Publication Data

US 2018/0351212 A1 Dec. 6, 2018

(30) Foreign Application Priority Data

May 31, 2017 (JP) ................................ 2017-107602

(51) Int. Cl.
*H01M 4/13* (2010.01)
*H01M 10/0587* (2010.01)
*H01M 4/139* (2010.01)
*H01M 2/30* (2006.01)
*H01M 10/0525* (2010.01)
*H01M 10/42* (2006.01)
*B60L 50/64* (2019.01)
*H01M 10/04* (2006.01)
*H01M 10/052* (2010.01)
*B60K 6/28* (2007.10)
(Continued)

(52) U.S. Cl.
CPC ......... *H01M 10/0587* (2013.01); *B60L 50/64* (2019.02); *H01M 2/30* (2013.01); *H01M 4/13* (2013.01); *H01M 4/139* (2013.01); *H01M 10/0431* (2013.01); *H01M 10/052* (2013.01); *H01M 10/0525* (2013.01); *H01M 10/425* (2013.01); *H01M 10/4257* (2013.01); *B60K 6/28* (2013.01); *B60Y 2200/91* (2013.01); *B60Y 2200/92* (2013.01); *H01M 2/1673* (2013.01); *H01M 4/667* (2013.01); *H01M 2010/4271* (2013.01); *H01M 2220/20* (2013.01); *Y10S 903/907* (2013.01)

(58) Field of Classification Search
None
See application file for complete search history.

(56) References Cited

U.S. PATENT DOCUMENTS

| 2009/0297929 | A1* | 12/2009 | Uchida | H01M 10/0431 429/94 |
| 2014/0058598 | A1* | 2/2014 | Matsui | H01M 4/131 701/22 |
| 2017/0179461 | A1* | 6/2017 | Moon | H01M 4/664 |

* cited by examiner

*Primary Examiner* — Jeremiah R Smith
(74) *Attorney, Agent, or Firm* — K&L Gates LLP

(57) ABSTRACT

A secondary battery includes a cathode terminal; an anode terminal; a wound electrode body; and a step reducing member. The step reducing member is attached to one or both of a first cathode wound portion and a first anode wound portion in one or more of a first region, a second region and a third region. The first region is in a major axis direction outside the cathode terminal in a wound direction of a cathode, and the second region is in the major axis direction outside the anode terminal in the wound direction of an anode and the third region between the cathode terminal and the anode terminal.

35 Claims, 9 Drawing Sheets

(51) Int. Cl.
*H01M 4/66* (2006.01)
*H01M 2/16* (2006.01)

SECONDARY BATTERY, BATTERY PACK, ELECTRIC VEHICLE, ELECTRIC POWER STORAGE SYSTEM, ELECTRIC TOOL, AND ELECTRONIC APPARATUS

CROSS REFERENCE TO RELATED APPLICATIONS

The present application claims priority to Japanese patent application no. JP2017-107602 filed on May 31, 2017. The entire contents of which are being incorporated herein by reference.

BACKGROUND OF THE INVENTION

The present technology generally relates to a secondary battery provided with a wound electrode body including a cathode and an anode, and a battery pack, an electric vehicle, an electric power storage system, an electric tool, and an electronic apparatus, using the secondary battery.

Various electronic apparatuses such as mobile phones are widely used, and there is a demand for miniaturization, weight reduction, and long life of the electronic apparatuses. Accordingly, a secondary battery has been developed as a power source, which is compact, lightweight, and capable of obtaining high energy density.

This secondary battery is studied for application not only to the electronic apparatus described above but also to another use. Examples include a battery pack that is detachably mounted on an electronic apparatus or the like, an electric vehicle such as an electric automobile, an electric power storage system such as a home electric power server, and an electric tool such as an electric drill.

Specifically, the secondary battery includes a wound electrode body serving as a battery element. The wound electrode body is formed by winding a cathode, an anode, and a separator after laminating the cathode and the anode with the separator interposed therebetween. The cathode is connected to a cathode lead and the anode is connected to an anode lead.

A configuration of the secondary battery having the wound electrode body affects structural stability of the wound electrode body, and thus greatly affects battery characteristics. Various studies have been made with respect to the configuration of the secondary battery including the wound electrode body.

Specifically, in order to prevent winding displacement of the electrode, an insulating tape is attached to a lower region of an uncoated portion provided in a current collector for an electrode tab welded to an upper region of the uncoated portion.

SUMMARY OF THE INVENTION

The present technology generally relates to a secondary battery provided with a wound electrode body including a cathode and an anode, and a battery pack, an electric vehicle, an electric power storage system, an electric tool, and an electronic apparatus, using the secondary battery. The present technology is made in light of the above problems, and it is an object of the present technology to provide a secondary battery capable of providing excellent battery characteristics, and a battery pack, an electric vehicle, an electric power storage system, an electric tool, and an electronic apparatus, using the secondary battery.

According to an embodiment of the present technology, a secondary battery is provided. The secondary battery includes:
a cathode terminal;
an anode terminal;
a wound electrode body; and
a step reducing member,
in which
in the wound electrode body,
a cathode and an anode are provided with a separator interposed between the cathode and the anode while being wound around a winding axis;
a section intersecting with the winding axis has a flat shape defined by a major axis and a minor axis;
the cathode includes a cathode current collector and a cathode active material layer provided on a part of the cathode current collector;
the anode includes an anode current collector and an anode active material layer provided on a part of the anode current collector;
the cathode includes an end portion on a wound inner side in a wound direction with a first cathode wound portion that extends in a major axis direction and the cathode terminal is attached to the end portion of the cathode; and
the anode includes an end portion on the wound inner side in the wound direction with a first anode wound portion that extends in the major axis direction while facing the first cathode wound portion across the separator, and the anode terminal is attached to the end portion of the anode and the anode terminal does not overlap with the cathode terminal in a minor axis direction,
wherein the step reducing member is attached to one or both of the first cathode wound portion and the first anode wound portion in one or more of a first region, a second region and a third region, and
wherein the first region is in the major axis direction outside the cathode terminal in the wound direction of the cathode, and the second region is in the major axis direction outside the anode terminal in the wound direction of the anode and the third region between the cathode terminal and the anode terminal.

Each of a battery pack, an electric vehicle, an electric power storage system, an electric tool, and an electronic apparatus according to an embodiment of the present technology includes a secondary battery having a configuration similar to that of the secondary battery of the embodiment of the present technology as described herein.

Details of the formation position and number of the step reducing members are as follows.

According to embodiments of the present technology, the step reducing member may be provided only in the first region, only in the second region, or only in the third region. In addition, the step reducing member may be provided in both the first region and the second region, in both the second region and the third region, or in both the first region and the third region. Further, the step reducing member may be provided in all of the first region, the second region, and the third region.

According to embodiments of the present technology, the step reducing member may be provided only in the first cathode wound portion, only in the first anode wound portion, or in both the first cathode wound portion and the first anode wound portion.

According to embodiments of the present technology, the number of step reducing members may be one or more.

According to embodiments of the present technology, the step reducing member is provided in one or more of the first cathode wound portion and the first anode wound portion in one or more of the first region, the second region, and the third region, so that excellent battery characteristics can be provided. In addition, at least the same effect can be obtained in each of the battery pack, the electric vehicle, the electric power storage system, the electric tool, and the electronic apparatus according to the embodiments of the present technology.

It should be understood that the effects described herein are not necessarily limited, and other suitable properties relating to the present technology may be realized and as further described.

DETAILED DESCRIPTION OF THE INVENTION

The present technology generally relates to a secondary battery provided with a wound electrode body including a cathode and an anode, and a battery pack, an electric vehicle, an electric power storage system, an electric tool, and an electronic apparatus, using the secondary battery. As described herein, the present disclosure will be described based on examples with reference to the drawings, but the present disclosure is not to be considered limited to the examples, and various numerical values and materials in the examples are considered by way of example.

First, a secondary battery according to an embodiment of the present technology will be described.

The secondary battery described here is a secondary battery including lithium as an electrode reactant, for example, and more specifically a lithium-ion secondary battery that can obtain battery capacity (capacity of an anode) by using an occlusion phenomenon of lithium and a releasing phenomenon of lithium. This "electrode reactant" is a substance used for advancing electrode reaction (charge and discharge reaction).

Figure 1:
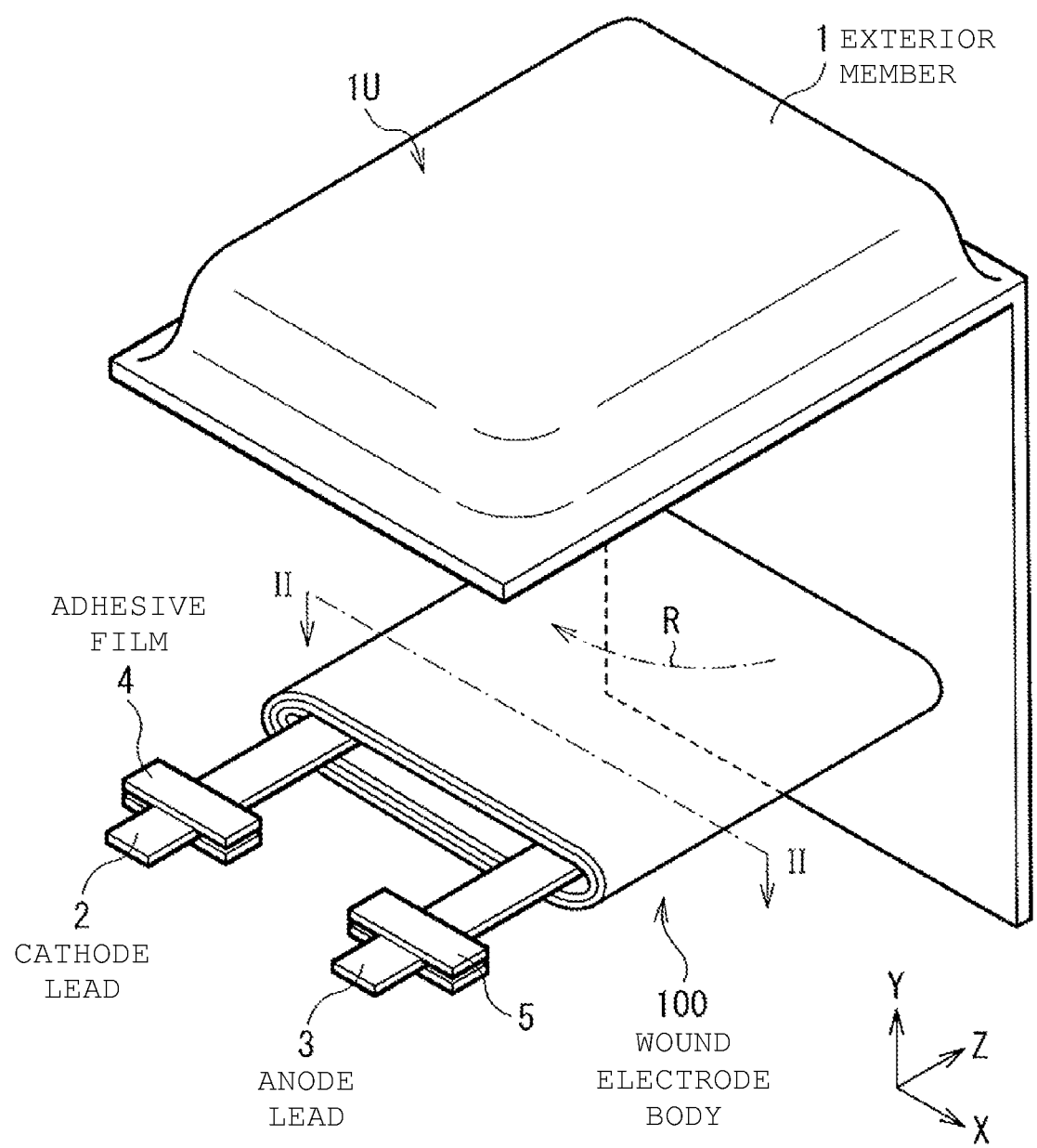
FIG. 1 is a perspective view illustrating a configuration of a secondary battery according to an embodiment of the present technology.
Figure 2:
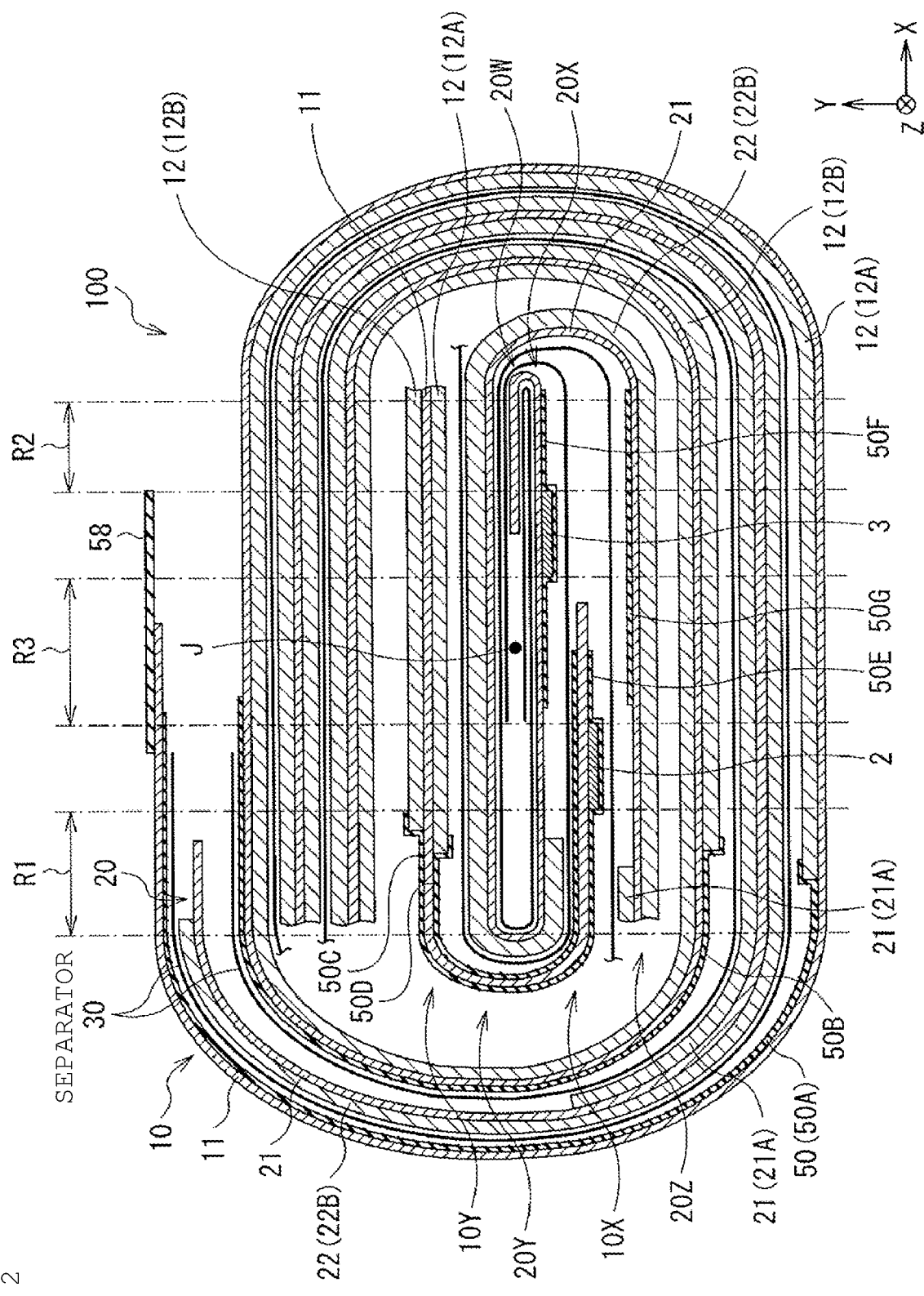
FIG. 2 is a sectional view illustrating a configuration of a wound electrode body taken along line II-II shown in FIG. 1.

According to an embodiment, a general configuration of the secondary battery will be described. FIG. 1 illustrates a perspective configuration of the secondary battery, and FIG. 2 illustrates a sectional configuration of a wound electrode body 100, taken along line II-II shown in FIG. 1.

Hereinafter, the dimension in the X-axis direction is defined as "width", the dimension in the Y-axis direction is defined as "thickness", and the dimension in the Z-axis direction is defined as "height".

This secondary battery is a laminate film type secondary battery using a film-like exterior member 1, for example.

Specifically, the secondary battery includes the film-like exterior member 1, the wound electrode body 100, a cathode lead 2, and an anode lead 3, as illustrated in FIG. 1, for example. FIG. 1 illustrates a state before the wound electrode body 100 is stored in the exterior member 1 (the exterior member 1 and the wound electrode body 100 are separated from each other) for easier viewing of the configuration of the exterior member 1 and the configuration of the wound electrode body 100.

The exterior member 1 is a housing member that mainly houses the wound electrode body 100 and the like.

The exterior member 1 is a sheet of film foldable in the direction of the arrow R as illustrated in FIG. 1, and the exterior member 1 is provided with a recess 1U for housing the wound electrode body 100, for example.

Specifically, the exterior member 1 is a laminated film or the like, for example. While a configuration of the laminate film is not particularly limited, it has a multilayer structure in which a fusion layer, a metal layer, and a surface protection layer are laminated in this order, for example.

In the manufacturing process of the secondary battery, one exterior member 1 is folded such that its fusion layer faces itself across the wound electrode body 100, and then outer peripheral portions of the fusion layer, facing each other, are fused to each other to seal the exterior member 1. Alternatively, two exterior members 1 may be disposed so as to face each other with the wound electrode body 100 interposed therebetween, and then their fusion layers facing each other may be fused to each other. In addition, two exterior members 1 may be disposed so as to face each other with the wound electrode body 100 interposed therebetween, and then outer peripheral portions of the two exterior members 1 may be bonded to each other with an adhesive.

The fusion layer includes any one or more kinds of film such as polyethylene film and polypropylene film, for example. The metal layer includes any one or more kinds of metal foil such as aluminum foil, for example. The surface protective layer includes any one or more kinds of film such as nylon film and polyethylene terephthalate film, for example.

In particular, the exterior member 1 is preferably an aluminum laminate film in which a polyethylene film, an aluminum foil, and a nylon film are laminated in this order. This is because excellent sealing properties and durability can be obtained. Alternatively, the exterior member 1 may be a laminate film having another multilayer structure, for example. In addition, the exterior member 1 is not limited to a laminated film, and may be a sheet of film including any one or more kinds of polypropylene film and the like, or may be a sheet of metal foil including any one or more kinds of aluminum and the like, for example.

The wound electrode body 100 is mainly a battery element responsible for charge and discharge reaction, and includes a cathode 10, an anode 20, a separator 30, and an electrolytic solution that is a liquid electrolyte, for example.

Specifically, after the cathode 10 and the anode 20 are laminated to each other with the separator 30 interposed therebetween, the wound electrode body 100 is formed by winding them around a winding axis J as a center, as illustrated in FIG. 2. For example, each of the cathode 10, the anode 20, and the separator 30 is impregnated with the electrolytic solution. The outermost peripheral portion of the wound electrode body 100 may be protected by a protective tape or the like, for example.

In particular, the wound electrode body 100 formed by the procedure described above is compressed to have a flat shape. That is, the wound electrode body 100 has a section in a flat shape. This "section" intersects with the winding axis J, and is taken along plane XY. The "flat shape" is defined by the major axis (X axis) and the minor axis (Y axis), and more specifically is substantially elliptical, having a width larger than a thickness.

A detailed configuration of the wound electrode body 100 according to an embodiment will be described later (refer to FIG. 3).

The cathode lead 2 is a cathode terminal attached to the cathode 10, more specifically is attached to a cathode current collector 11 to be described later, for example.

The cathode lead 2 is led out from the inside to the outside of the exterior member 1, for example, and contains any one or more kinds of conductive material such as aluminum. The cathode lead 2 has any one or more kinds of thin plate shape and mesh shape, for example.

The anode lead 3 is an anode terminal attached to the anode 20, more specifically is attached to an anode current collector 21 to be described later, for example.

For example, the anode lead 3 is led out from the inside to the outside of the exterior member 1, and contains any one or more kinds of conductive material such as copper, nickel, stainless steel, and the like. The lead-out direction of the anode lead 3 is the same as the lead-out direction of the cathode lead 2, for example, and the anode lead 3 has a shape identical to that of the cathode lead 2, for example.

Between the exterior member 1 and the cathode lead 2, an adhesive film 4 is inserted, for example, and between the exterior member 1 and the anode lead 3, an adhesive film 5 is inserted, for example.

Each of the adhesive films 4 and 5 mainly prevents the outside air from entering the inside of the exterior member 1, and contains any one or more kinds of adhesive material, for example. The "adhesive material" has adhesiveness to each of the cathode lead 2 and the anode lead 3, and is a polyolefin resin or the like, for example. The polyolefin resin is polyethylene, polypropylene, modified polyethylene, modified polypropylene, or the like, for example.

Figure 4:
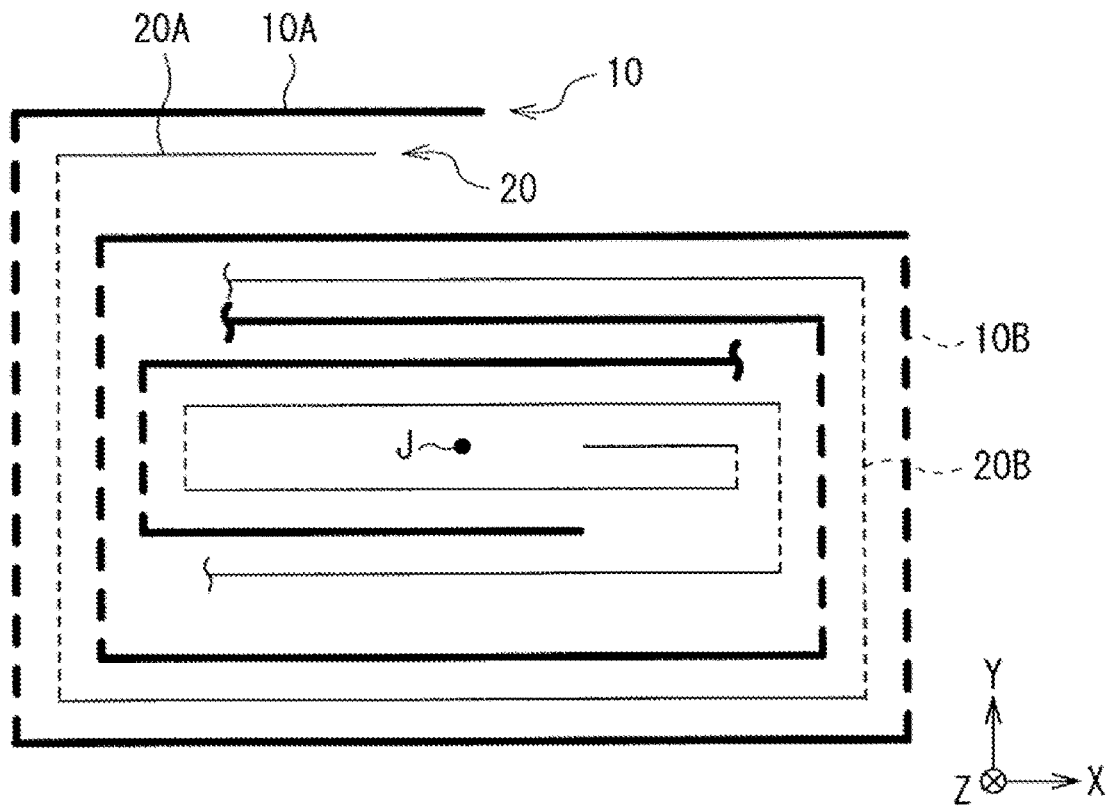
FIG. 4 is a schematic diagram illustrating each of a cathode and an anode illustrated in FIG. 2.
Figure 5:
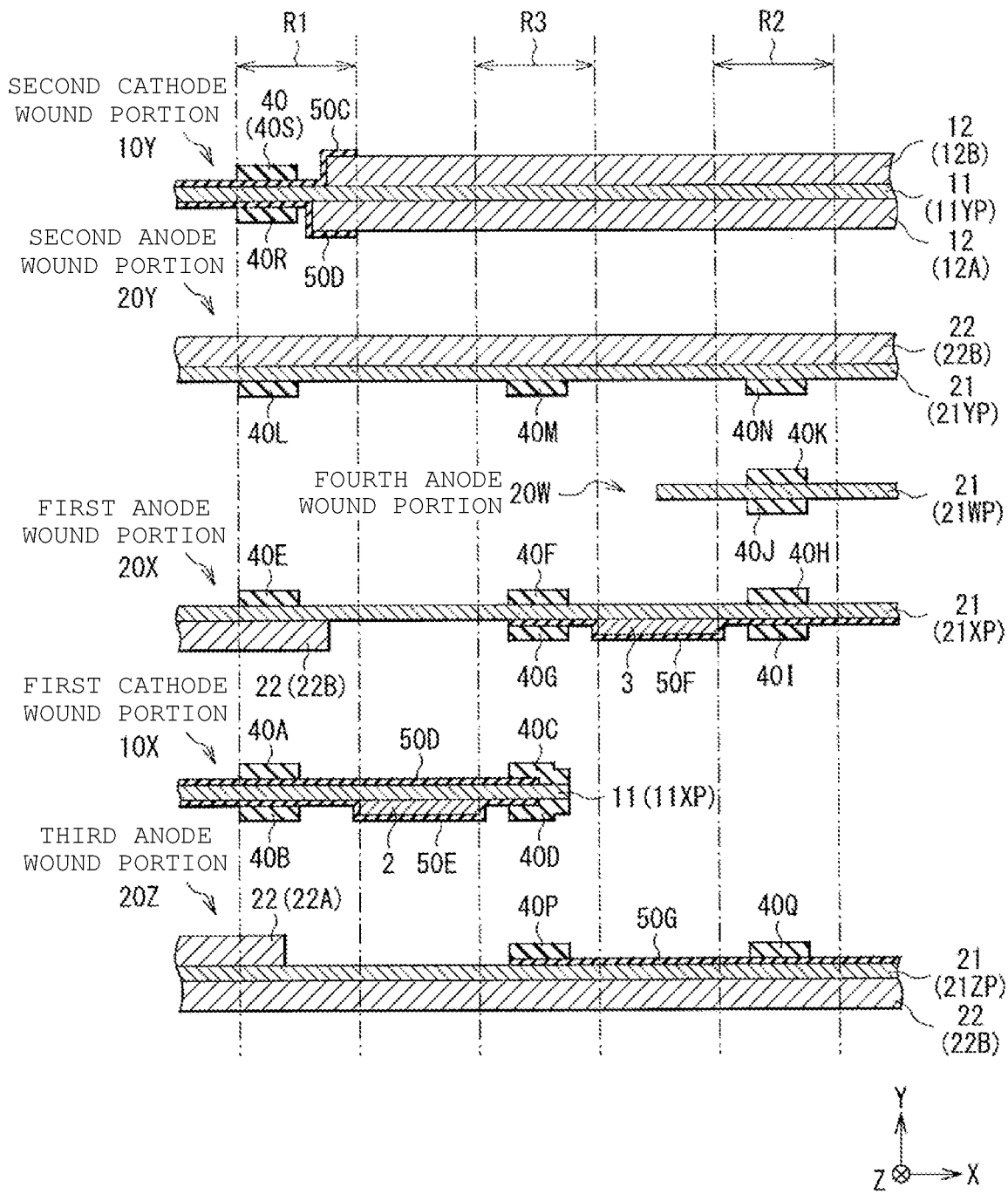
FIG. 5 is an enlarged sectional view illustrating a configuration of a main portion of each of the cathode and the anode illustrated in FIG. 2.

According to an embodiment, a configuration of the wound electrode body 100 will be described. FIG. 3 illustrates a part of a sectional configuration of the wound electrode body 100 illustrated in FIG. 2 in an enlarged manner. FIG. 4 schematically illustrates each of the cathode 10 and the anode 20 illustrated in FIG. 2. FIG. 5 illustrates a sectional configuration of a main portion of each of the cathode 10 and the anode 20 illustrated in FIG. 2 in an enlarged manner. FIG. 4 illustrates each of the cathode 10 and the anode 20 with a single line. In this case, the cathode 10 is indicated by a thick line and the anode 20 is indicated by a thin line to facilitate distinguishing the cathode 10 and the anode 20 from each other.

Figure 3:
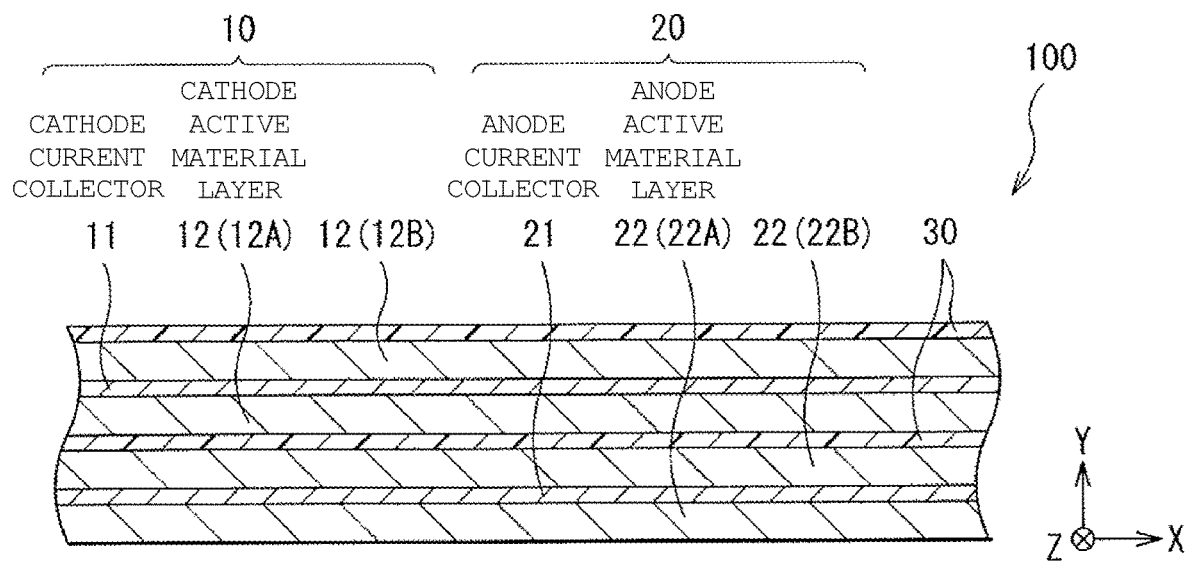
FIG. 3 is an enlarged sectional view illustrating a part of the configuration of the wound electrode body illustrated in FIG. 2.

As illustrated in FIG. 3, the cathode 10 includes a cathode current collector 11 and two cathode active material layers 12 provided on both surfaces of the cathode current collector 11, for example. Each of the cathode active material layers 12 is provided only on a part of the cathode current collector 11. Details of an installation range of the cathode active material layer 12 with respect to the cathode current collector 11 will be described later.

The cathode current collector 11 contains any one or more kinds of conductive material such as aluminum, nickel, stainless steel, and the like, for example. The cathode current collector 11 may be a single layer or a multilayer.

The cathode active material layer 12 contains, as cathode active material, any one or more kinds of cathode material capable of occluding and releasing lithium. The cathode active material layer 12 may further contain any one or more kinds of other material such as a cathode binder, a cathode conductive agent, and the like.

In particular, the cathode active material layer 12 is provided on both surfaces of the cathode current collector 11 as described above. Thus, the cathode 10 includes an inner-peripheral-side cathode active material layer 12A provided on a surface of the cathode current collector 11 on an inner peripheral side, and an outer-peripheral-side cathode active material layer 12B provided on a surface of the cathode current collector 11 on an outer peripheral side, for example. The "inner peripheral side" is close to the winding axis J, and the "outer peripheral side" is away from the winding axis J.

The cathode material is preferably a lithium-containing compound. This is because a high energy density can be obtained. The kind of the lithium-containing compound is not particularly limited, and includes a lithium-containing composite oxide and a lithium-containing phosphate compound, for example.

The lithium-containing composite oxide is a generic term for oxides containing lithium and one or more kinds of other element as constituent elements, and has a crystal structure of any one of a layered rock salt type and a spinel type, for example. The lithium-containing phosphate compound is a generic term for phosphate compounds containing lithium and one or more kinds of other element as constituent elements, and has an olivine type crystal structure, for example. This "other element" is other than lithium.

The type of the other element is not particularly limited, and is preferably an element belonging to Group 2 to Group 15 of the long period type periodic table. Specifically, the other element includes nickel (Ni), cobalt (Co), manganese (Mn), iron (Fe), and the like. This is because a high voltage can be obtained.

The lithium-containing composite oxide having a layered rock salt type crystal structure is represented by each of the following formulas (1) to (3), for example.

$$Li_aMn_{(1-b-c)}Ni_bM11_cO_{(2-d)}F_e \qquad (1)$$

where M11 is at least one of the following elements: cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W). The "a" to "e" satisfy the following: $0.8 \leq a \leq 1.2$, $0 < b < 0.5$, $0 \leq c \leq 0.5$, $(b+c) < 1$, $-0.1 \leq d \leq 0.2$, and $0 \leq e \leq 0.1$. However, the composition of lithium varies depending on the charge and discharge state, and the "a" is a value in a fully discharged state.

$$Li_aNi_{(1-b)}M12_bO_{(2-c)}F_d \qquad (2)$$

where M12 is at least one of the following elements: cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). The "a" to "d" satisfy the following: $0.8 \leq a \leq 1.2$, $0.005 \leq b \leq 0.5$, $-0.1 \leq c \leq 0.2$, and $0 \leq d \leq 0.1$. However, the composition of lithium varies depending on the charge and discharge state, and the "a" is a value in a fully discharged state.

$$Li_aCo_{(1-b)}M13_bO_{(2-c)}F_d \qquad (3)$$

where M13 is at least one of the following elements: nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). The "a" to "d" satisfy the following: $0.8 \leq a \leq 1.2$, $0 \leq b \leq 0.5$, $-0.1 \leq c \leq 0.2$, and $0 \leq d \leq 0.1$. However, the composition of lithium varies depending on the charge and discharge state, and the "a" is a value in a fully discharged state.

Specific examples of the lithium-containing composite oxide having a layered rock-salt type crystal structure include the following: $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, and the like.

When the lithium-containing composite oxide having a layered rock-salt type crystal structure contains nickel, cobalt, manganese, and aluminum as constituent elements, an atomic ratio of nickel is preferably 50 atomic % or more. This is because a high energy density can be obtained.

The lithium-containing composite oxide having a spinel type crystal structure is represented by the following formula (4), for example.

$$Li_aMn_{(2-b)}M14_bO_cF_d \qquad (4)$$

where M14 is at least one of the following elements: cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W). The "a" to "d" satisfy the following: $0.9 \leq a \leq 1.1$, $0 \leq b \leq 0.6$, $3.7 \leq c \leq 4.1$, and $0 \leq d \leq 0.1$. However, the composition of lithium varies depending on the charge and discharge state, and the "a" is a value in a fully discharged state.

Specific examples of the lithium-containing composite oxide having a spinel type crystal structure include $LiMn_2O_4$ and the like.

The lithium-containing phosphate compound having an olivine type crystal structure is represented by the following formula (5), for example.

$$Li_aM15PO_4 \qquad (5)$$

where M15 is at least one the following elements: cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr). The "a" satisfies the following: $0.9 \leq a \leq 1.1$. However, the composition of lithium varies depending on the charge and discharge state, and the "a" is a value in a fully discharged state.

Specific examples of the lithium-containing phosphate compound having an olivine type crystal structure include $LiFePO_4$, $LiMnPO_4$, $LiFe_{0.5}Mn_{0.5}PO_4$, $LiFe_{0.3}Mn_{0.7}PO_4$, and the like.

The lithium-containing composite oxide may be a compound represented by the following formula (6).

$$(Li_2MnO_3)_x(LiMnO_2)_{1-x} \qquad (6)$$

where the "x" satisfies the following: $0 \leq x \leq 1$. However, the composition of lithium varies depending on the charge and discharge state, and the "x" is a value in a fully discharged state.

In addition, the cathode material may be an oxide, a disulfide, a chalcogenide, a conductive polymer, or the like, for example. The oxide is titanium oxide, vanadium oxide, manganese dioxide, or the like, for example. The disulfide is titanium disulfide, molybdenum sulfide, or the like, for example. The chalcogenide is niobium selenide or the like, for example. The conductive polymer is sulfur, polyaniline, polythiophene, or the like, for example. As a matter of course, the cathode material may be a material other than the above-mentioned series of materials.

The cathode binder contains any one or more kinds of synthetic rubber, high molecular compound, or the like, for example. The synthetic rubber is styrene-butadiene rubber, fluorine rubber, ethylene propylene diene, or the like, for example. The high molecular compound is polyvinylidene fluoride, polyimide, or the like, for example.

The cathode conductive agent contains any one or more kinds of carbon material or the like, for example. This carbon material is graphite, carbon black, acetylene black, ketjen black, or the like, for example. The cathode conductive agent may be a metal material, a conductive polymer, or the like as long as it is a conductive material.

As illustrated in FIG. 3, the anode 20 includes an anode current collector 21, and two anode active material layers 22 provided on both surfaces of the anode current collector 21, for example. Each of the anode active material layers 22 is provided only on a part of the anode current collector 21. Details of an installation range of the anode active material layer 22 with respect to the anode current collector 21 will be described later.

The anode current collector 21 contains any one or more kinds of conductive material such as copper, aluminum, nickel, stainless steel, and the like, for example. The anode current collector 21 may be a single layer or a multilayer.

It is preferable that the anode current collector 21 has a roughened surface. This is because adhesion of the anode active material layer 22 to the anode current collector 21 is improved by using the so-called anchor effect. In this case, the surface of the anode current collector 21 may be roughened at least in a region facing the anode active material layer 22. A method of roughening is a method of forming fine particles by using electrolytic treatment, or the like, for example. The electrolytic treatment causes fine particles to be formed on the surface of the anode current collector 21 by the electrolytic method in an electrolytic bath, so that irregularities are formed on the surface of the anode current collector 21. A copper foil prepared by the method using electrolytic treatment is generally called an electrolytic copper foil.

The anode active material layer 22 contains, as an anode active material, any one or more kinds of anode material capable of occluding and releasing lithium. Alternatively, the anode active material layer 22 may further contain any one or more kinds of other material such as an anode binder, an anode conductive agent, and the like.

As described herein, the anode active material layer 22 is provided on both surfaces of the anode current collector 21. Thus, the anode 20 includes an inner-peripheral-side anode active material layer 22A provided on a surface of the anode current collector 21 on an inner peripheral side, and an outer-peripheral-side anode active material layer 22B provided on a surface of the anode current collector 21 on an outer peripheral side, for example.

To suppress unintentional precipitation of lithium metal on a surface of the anode 20 during charging, it is preferable that chargeable capacity of the anode material is larger than discharge capacity of the cathode 10. Specifically, it is preferable that an electrochemical equivalent of the anode material capable of occluding and releasing lithium is larger than an electrochemical equivalent of the cathode 10.

The anode material is a carbon material, for example. This is because a high energy density can be stably obtained due to an extremely small change in crystal structure at the time of occluding lithium and at the time of releasing lithium. This is also because the carbon material also serves as an anode conductive agent to improve conductivity of the anode active material layer 22.

The carbon material is graphitizable carbon, non-graphitizable carbon, graphite, or the like, for example. It is preferable that interplanar spacing of the (002) plane with respect to the non-graphitizable carbon is 0.37 nm or more, and interplanar spacing of the (002) plane with respect to the graphite is 0.34 nm or less. More specifically, the carbon material includes pyrolytic carbons, cokes, glassy carbon fibers, a fired body of an organic polymer compound, activated carbon, carbon blacks, and the like, for example. The cokes include pitch coke, needle coke, petroleum coke, and the like. The fired body of an organic polymer compound is a substance in which a polymer compound such as a phenol resin and a furan resin is fired (carbonized) at an appropriate temperature. Besides this, the carbon material may be low crystalline carbon that is heat-treated at a temperature of about 1000° C. or less, or may be amorphous carbon. The carbon material may have any one of shapes of a fiber, a sphere, a grain, and a scale.

The anode material is a metal-based material, for example. This "metal-based material" is a generic term for materials including any one or more kinds of metal element and metalloid element as a constituent element. This is because a high energy density can be obtained.

The metal-based material may be a single substance, an alloy, a compound, two or more kinds of them, or a material containing at least a part of one or more phases of them. The alloy includes a material containing one or more kinds of metal element and one or more kinds of metalloid element, along with a material composed of two or more kinds of metal elements. The alloy also may contain a nonmetallic element. The metal-based material has a structure in which a solid solution, a eutectic (eutectic mixture), an intermetallic compound, and a coexisting material of two or more kinds thereof, for example.

Each of the metal element and the metalloid element is an element capable of forming an alloy with lithium, for example. Specifically, each of the metal element and the metalloid element includes magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), platinum (Pt), or the like, for example.

In particular, one or both of silicon and tin are preferable. This is because their excellent ability of occluding and releasing lithium enables a remarkably high energy density to be obtained.

A material containing silicon as a constituent element may be a single substance of silicon, an alloy of silicon, a compound of silicon, two or more kinds of them, or a material including at least a part containing a phase of one or more kinds of them.

A material containing tin as a constituent element may be a single substance of tin, an alloy of tin, a compound of tin, two or more kinds of them, or a material including at least a part containing a phase of one or more kinds of them.

The term, "single substance", described herein means a single substance in a general sense, so that the single substance may contain a trace amount of impurities. That is, a purity of the single substance is not necessarily limited to 100%.

The alloy of silicon contains any one or more kinds of element such as tin, nickel, copper, iron, cobalt, manganese, zinc, indium, silver, titanium, germanium, bismuth, antimony, chromium, and the like, as an element other than silicon, for example. The compound of silicon contains any one or more kinds of element such as carbon, oxygen, and the like, as a constituent element other than silicon, for example. The compound of silicon may contain any one or more kinds of series of elements described for the alloy of silicon, as a constituent element other than silicon, for example.

Specific examples of the alloy of silicon and specific examples of the compound of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), $LiSiO$, and the like. The "v" in $SiO_v$ may satisfy the following: $0.2<v<1.4$.

The alloy of tin contains any one or more kinds of element such as silicon, nickel, copper, iron, cobalt, manganese, zinc, indium, silver, titanium, germanium, bismuth, antimony, chromium, and the like, as an element other than tin, for example. The compound of tin contains any one or more kinds of element such as carbon, oxygen, and the like, as a constituent element other than tin, for example. The compound of tin may contain any one or more of kinds of series of elements described for the alloy of tin, as a constituent element other than tin, for example.

Specific examples of the alloy of tin and the compound of tin include $SnO_w$ ($0<w\leq2$), $SnSiO_3$, $LiSnO$, $Mg_2Sn$, and the like.

In particular, it is preferable that the material containing tin as a constituent element is a material (tin-containing material) containing a second constituent element and a third constituent element together with tin serving as a first constituent element, for example. The second constituent element includes any one or more kinds of element such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon, for example. The third constituent element includes any one or more kinds of element such as boron, carbon, aluminum, and phosphorus, for example. This is because high battery capacity and excellent cycle characteristics can be obtained.

In particular, it is preferable that the tin-containing material includes a material (tin-cobalt-carbon-containing material) containing tin, cobalt, and carbon, as constituent elements. This tin-cobalt-carbon-containing material has a carbon content of 9.9 mass % to 29.7 mass %, and a ratio between a cobalt content and a tin content (Co/(Sn+Co)) of 20 mass % to 70 mass %, for example. This is because a high energy density can be obtained.

The tin-cobalt-carbon-containing material has a phase containing tin, cobalt, and carbon as constituent elements, and the phase is preferably low crystalline or amorphous. This phase is a phase (reaction phase) that can react with lithium, so that the reaction phase enables excellent characteristics to be obtained. It is preferable that a half-value width (diffraction angle $2\theta$) of a diffraction peak obtained by X-ray diffraction of this reaction phase is 1° or more when CuK$\alpha$ ray is used as a specific X-ray and drawing speed is 1°/min. This is because lithium is occluded and released smoothly, and reactivity with the electrolytic solution is reduced. The tin-cobalt-carbon-containing material may have a phase containing a single element of each element or a part of each element, along with the phase that is low crystalline or amorphous.

In order to determine whether the diffraction peak obtained by X-ray diffraction is a diffraction peak corresponding to a reaction phase reactable with lithium, an X-ray diffraction chart before and after an electrochemical reaction with lithium may be compared, for example. When position of a diffraction peak changes before and after the electrochemical reaction with lithium, the diffraction peak corresponds to the reaction phase reactable with lithium. In this case, the diffraction peak of the reaction phase, which is low crystalline or amorphous, is detected within a range of $2\theta=20°$ to 50°, for example. It is conceivable that this reaction phase contains the above-described series of constituent elements, and is low crystalline or amorphous due to the presence of carbon, for example.

In the tin-cobalt-carbon-containing material, it is preferable that at least a part of carbon serving as a constituent element is bonded to a metal element or a metalloid element serving as another constituent element. This is because agglomeration of tin and crystallization of tin are suppressed. The bonding state of the element can be checked using X-ray photoelectron spectroscopy (XPS), for example Commercially available devices each use an Al-K$\alpha$ ray or an Mg-K$\alpha$ ray as a soft X-ray, for example. When a part or all of carbon is bonded to a metal element, a metalloid element, or the like, a peak of a composite wave of the is orbit (C1s) of carbon is detected in a region lower than 284.5 eV. However, it is assumed that energy calibration is performed so that a peak of the 4f orbit (Au4f) of the gold atom is detected at the energy position of 84.0 eV. In this case, surface contaminated carbon normally exists on a surface of a substance, so that an energy position at which the C1s peak of the surface contaminated carbon is detected is set to 284.8 eV to set the peak as an energy reference. In the XPS measurement, a waveform of the C1s peak is usually obtained with a peak of the surface contaminated carbon and a peak of the carbon in the Sn—Co—C-containing material. Thus, the C1s peak is analyzed using commercially available software to separate the C1s peak into the peak of the surface contaminated carbon and the peak of the carbon in the Sn—Co—C-containing material, for example. In the analysis of the waveform, an energy position of a main peak present on the lowest bound energy side is defined as the energy reference (284.8 eV).

This tin-cobalt-carbon-containing material is not limited to a material (SnCoC) where the constituent elements are only tin, cobalt, and carbon. The tin-cobalt-carbon-containing material may further contain any one or more kinds of element such as silicon, iron, nickel, chromium, indium, niobium, germanium, titanium, molybdenum, aluminum, phosphorus, gallium, and bismuth, along with tin, cobalt and carbon.

Besides the tin-cobalt-carbon-containing material, a material containing tin, cobalt, iron and carbon as constituent elements (tin-cobalt-iron-carbon-containing material) is also preferable. The composition of this tin-cobalt-iron-carbon-containing material is arbitrary. For example, when an iron content is set to a small value, a carbon content is from 9.9% by mass to 29.7% by mass, an iron content is from 0.3% by mass to 5.9% by mass, and a ratio between a cobalt content and a tin content (Co/(Sn+Co)) is 30 mass % to 70 mass %. When an iron content is set to a large value, a carbon content is 11.9 mass % to 29.7 mass %, a ratio of a tin content, a cobalt content, and an iron content ((Co+Fe)/(Sn+Co+Fe)) is 26.4 mass % to 48.5 mass %, and a ratio between a cobalt content and an iron content (Co/(Co+Fe)) is 9.9 mass % to 79.5 mass %. This is because a high energy density can be obtained. The tin-cobalt-iron-carbon-containing material has physical properties (half-width, etc.) similar to those of the above-mentioned tin-cobalt-carbon-containing material, for example.

In addition, the anode material may be a metal oxide or a polymer compound, for example. The metal oxide is iron oxide, ruthenium oxide, molybdenum oxide, or the like, for example. The polymer compound is polyacetylene, polyaniline, polypyrrole, or the like, for example.

In particular, it is preferable that the anode material contains both a carbon material and a metal-based material for the reason described below.

While a metal-based material, particularly, a material containing one or both of silicon and tin as a constituent element has an advantage that the theoretical capacity is high, it has a concern of being likely to expand and shrink greatly during charging and discharging. Meanwhile, while the carbon material has a concern of low theoretical capacity, it has an advantage of being less likely to expand and shrink during charging and discharging. Thus, using both the carbon material and the metal-based material suppresses expansion and shrinkage of the anode material during charging and discharging while obtaining a high theoretical capacity (or a battery capacity).

The anode active material layer 22B is formed using any one or more kinds of method such as a coating method, a gas phase method, a liquid phase method, a thermal spraying method, and a firing method (a sintering method).

The coating method allows a solution obtained by dissolving or dispersing a mixture of a particulate (powdered) anode active material, an anode binder, and the like into an organic solvent or the like to be applied to the anode current collector 21, for example. The vapor phase method is a physical deposition method, a chemical deposition method, or the like, for example. More specifically, the vapor phase method is vacuum evaporation, sputtering, ion plating, laser ablation, thermal chemical vapor deposition, chemical vapor deposition (CVD), plasma enhanced chemical vapor deposition, or the like, for example. The liquid phase method is an electrolytic plating method, an electroless plating method, or the like, for example. The thermal spraying method is a method of spraying the anode active material in a molten state or in a semi-molten state onto the anode current collector 21. The firing method allows the above solution to be applied to the anode current collector 21 to heat-treat the solution at a temperature higher than the melting point of the anode binder or the like, for example. This firing method is an atmosphere firing method, a reaction firing method, a hot press firing method, or the like, for example.

It is preferable that this secondary battery includes an anode material capable of occluding and releasing lithium, having an electrochemical equivalent larger than an electrochemical equivalent of the cathode, to prevent unintentional precipitation of lithium metal on the surface of the anode 20 during charging, as described above. It is also preferable that the amount of the cathode active material and the amount of the anode active material are adjusted to each other in consideration of the fact that an open circuit voltage of 4.25 V or more (or a battery voltage) at the time of full charging increases the amount of released lithium per mass as compared with an open circuit voltage of 4.20 V at the time of full charging, even if the same cathode active material is used. This enables a high energy density to be obtained.

The separator 30 is interposed between the cathode 10 and the anode 20 as illustrated in FIG. 3, for example. As a result, the separator 30 allows lithium ions to pass therethrough while preventing a short-circuit current due to contact between the cathode 10 and the anode 20. FIG. 2 illustrates the separator 30 with a bold line to simplify the illustration.

The separator 30 includes any one or more kinds of porous membrane such as synthetic resin, ceramic, and the like, and may be a laminated film of two or more kinds of porous membrane. The synthetic resin is polytetrafluoroethylene, polypropylene, polyethylene, or the like, for example.

In particular, the separator 30 may include the above-described porous membrane (base material layer) and a polymer compound layer provided on one side or both sides of the base material layer, for example. This is because adhesion of the separator 30 to the cathode 10 is improved as well as adhesion of the separator 30 to the anode 20 is improved to suppress distortion of the wound electrode body 100. This suppresses not only decomposition reaction of the electrolytic solution but also leakage of the electrolytic solution impregnated in the base material layer, so that resistance is less likely to increase and the secondary battery is less likely to expand even when charging and discharging are repeated.

The polymer compound layer contains any one or more kinds of polymer compound such as polyvinylidene fluoride, and the like, for example. This is because it is excellent in physical strength and electrochemically stable. When this polymer compound layer is formed, a solution with a polymer compound dissolved in an organic solvent or the like is applied to a base material layer, and the base material layer is dried, for example. Alternatively, a base material layer may be immersed in a solution and then the base material layer may be dried, for example.

The polymer compound layer may contain any one or more kinds of insulating particle such as an inorganic particle, for example. The kind of the inorganic particle is aluminum oxide, aluminum nitride, or the like, for example.

The electrolytic solution contains a solvent and an electrolyte salt. The electrolytic solution may further contain any one or more kinds of other material such as an additive.

The solvent includes any one or more kinds of nonaqueous solvent such as an organic solvent. An electrolytic solution containing a nonaqueous solvent is a so-called nonaqueous electrolytic solution.

The nonaqueous solvent is a cyclic carbonate ester, a chain carbonate ester, lactone, a chain carboxylic acid ester, nitrile (mononitrile), or the like, for example. This is because excellent battery capacity, cycle characteristics, storage characteristics, and the like can be obtained.

The cyclic carbonate ester is ethylene carbonate, propylene carbonate, butylene carbonate, or the like, for example. The chain carbonate ester is dimethyl carbonate, diethyl carbonate, ethyl methyl carbonate, methyl propyl carbonate, or the like, for example. The lactone is γ-butyrolactone, γ-valerolactone, or the like, for example. The chain carboxylic acid ester is methyl acetate, ethyl acetate, methyl propionate, ethyl propionate, methyl butyrate, methyl isobutyrate, methyl trimethylacetate, ethyl trimethylacetate, or the like, for example. The nitrile is acetonitrile, methoxyacetonitrile, 3-methoxypropionitrile, or the like, for example.

Besides, the nonaqueous solvent may be 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, dimethylsulfoxide, or the like, for example. This is because similar advantages can be obtained.

In particular, any one or more kinds of cyclic carbonate ester and chain carbonate ester are preferable, and any one or more kinds of ethylene carbonate, propylene carbonate, dimethyl carbonate, diethyl carbonate, ethyl methyl carbonate, and the like are more preferable. This is because high battery capacity, excellent cycle characteristics, excellent storage characteristics, and the like can be obtained. In this case, a combination of a high viscosity (high permittivity) solvent (e.g., relative permittivity E 30) such as ethylene carbonate, propylene carbonate, or the like, and a low viscosity solvent (e.g., viscosity 1 mPa·s) such as dimethyl carbonate, ethyl methyl carbonate, diethyl carbonate, or the like, is more preferable. This is because dissociation properties of the electrolyte salt and mobility of ions are improved.

The nonaqueous solvent may be an unsaturated cyclic carbonate ester, a halogenated carbonate ester, a sulfonic acid ester, an acid anhydride, a dicyano compound (dinitrile compound), a diisocyanate compound, a phosphate ester, a chain compound having a carbon-carbon triple bond, or the like, for example. This is because chemical stability of the electrolytic solution is improved.

The unsaturated cyclic carbonate ester is a generic term for a cyclic carbonate ester having one or more unsaturated bonds (carbon-carbon double bond or carbon-carbon triple bond). The unsaturated cyclic carbonate ester is vinylene carbonate, vinyl ethylene carbonate, methylene ethylene carbonate, or the like, for example. An unsaturated cyclic carbonate ester content in the nonaqueous solvent is not particularly limited, and is 0.01 wt % to 10 wt %, for example.

The halogenated carbonate ester is a generic term for a cyclic or chain carbonate ester containing one or more halogen elements as constituent elements. When the halogenated carbonate ester contains two or more halogen elements as constituent elements, the kind of the two or more halogen elements may be one or more. The cyclic halogenated carbonate ester is 4-fluoro-1,3-dioxolan-2-one, 4,5- difluoro-1, 3-dioxolan-2-one, or the like, for example. The chain halogenated carbonate ester is fluoromethyl methyl carbonate, bis(fluoromethyl) carbonate, difluoromethyl methyl carbonate, or the like, for example. A halogenated carbonate content in the nonaqueous solvent is not particularly limited, and is 0.01 wt % to 50 wt %, for example.

The sulfonic acid ester is a monosulfonic acid ester, a disulfonic acid ester, or the like, for example. A sulfonic acid ester content in the nonaqueous solvent is not particularly limited, and is 0.01 wt % to 10 wt %, for example.

The monosulfonic acid ester may be a cyclic monosulfonic acid ester or a chain monosulfonic acid ester. The cyclic monosulfonic acid ester is sultone such as 1,3-propane sultone, 1,3-propene sultone, or the like, for example. The chain monosulfonic acid ester is a compound in which a cyclic monosulfonic acid ester is cut in the middle, or the like, for example. The disulfonic acid ester may be a cyclic disulfonic acid ester or a chain disulfonic acid ester.

The acid anhydride is a carboxylic acid anhydride, a disulfonic acid anhydride, a carboxylic acid sulfonic acid anhydride, or the like, for example. The carboxylic acid anhydride is succinic anhydride, glutaric anhydride, maleic anhydride, or the like, for example. The disulfonic acid anhydride is ethanedisulfonic anhydride, propanedisulfonic anhydride, or the like, for example. The carboxylic acid sulfonic acid anhydride is sulfobenzoic anhydride, sulfopropionic anhydride, sulfobutyric anhydride, or the like, for example. An acid anhydride content in the nonaqueous solvent is not particularly limited, and is 0.5 wt % to 5 wt %, for example.

The dinitrile compound is represented by NC—R1-CN (R1 is any one of an alkylene group and an arylene group), for example. The dinitrile compound is succinonitrile (NC—$C_2H_4$—CN), glutaronitrile(NC—$C_3H_6$—CN), adiponitrile (NC—$C_4H_8$—CN), phthalonitrile (NC—$C_6H_4$—CN), or the like, for example. A dinitrile compound content in the nonaqueous solvent is not particularly limited, and is 0.5 wt % to 5 wt %, for example.

The diisocyanate compound is represented by OCN—R2-NCO (R2 is any one of an alkylene group and an arylene group), for example. This diisocyanate compound is, for example, hexamethylene diisocyanate (OCN—$C_6H_{12}$—NCO) or the like. A diisocyanate compound content in the nonaqueous solvent is not particularly limited, and is 0.5 wt % to 5 wt %, for example.

The phosphate ester is trimethyl phosphate, triethyl phosphate, or the like, for example. A phosphate ester content in the nonaqueous solvent is not particularly limited, and is 0.5 wt % to 5 wt %, for example.

The chain compound having a carbon-carbon triple bond is a generic term for a chain compound having one or more carbon-carbon triple bonds (—C≡C—). The chain compound having a carbon-carbon triple bond is propargyl methyl carbonate (CH≡C—$CH_2$—O—C(=O)—O—$CH_3$), propargyl methyl sulfonate (CH≡C—$CH_2$—O—S(=O)$_2$—$CH_3$), or the like, for example. A chain compound content having a carbon-carbon triple bond in the nonaqueous solvent is not particularly limited, and is 0.5 wt % to 5 wt %, for example (Electrolyte Salt)

The electrolyte salt includes any one or more kinds of lithium salt, for example. The electrolyte salt may contain a salt other than the lithium salt, for example. The salt other than lithium is a salt of light metal other than lithium, or the like, for example.

The lithium salt is lithium hexafluorophosphate ($LiPF_6$), lithium tetrafluoroborate ($LiBF_4$), lithium perchlorate (Li$ClO_4$), lithium hexafluoroarsenate ($LiAsF_6$), lithium tetraphenylborate (LiB($C_6H_5$)$_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), or the like, for example. This is because excellent battery capacity, cycle characteristics, storage characteristics, and the like can be obtained.

In particular, any one or more kinds of lithium hexafluorophosphate, lithium tetrafluoroborate, lithium perchlorate, and lithium hexafluoroarsenate are preferable, and lithium hexafluorophosphate is more preferable. This is because internal resistance decreases.

An electrolyte salt content is not particularly limited, and is preferably 0.3 mol/kg to 3.0 mol/kg with respect to a solvent. This is because high ion conductivity can be obtained.

As illustrated in FIG. 2, the cathode 10 and the anode 20 are wound so that the cathode 10 is disposed outside and the anode 20 is disposed inside, for example.

As described above, the cathode active material layer 12 is provided only on a part of the cathode current collector 11. Thus, the inner-peripheral-side cathode active material layer 12A is provided only on a part of the inner peripheral surface of the cathode current collector 11, for example, and the outer-peripheral-side cathode active material layer 12B is provided only on a part of the outer peripheral surface of the cathode current collector 11, for example.

Specifically, the inner-peripheral-side cathode active material layer 12A is not provided on the inner peripheral surface of the cathode current collector 11 and the outer-peripheral-side cathode active material layer 12B is not provided on the outer peripheral surface of the cathode current collector 11, in an end portion of the cathode 10 on a wound outer side, for example. For this reason, the cathode current collector 11 is exposed in the end portion of the cathode 10 on the wound outer side, for example. The "wound outer side" described here is an outer side (a side close to an outer end portion) in the wound direction of the cathode 10.

In the end portion of the cathode 10 on the wound outer side, a region where the inner-peripheral-side cathode active material layer 12A is not provided on the inner peripheral surface of the cathode current collector 11, that is, a position of the end portion of the inner-peripheral-side cathode active material layer 12A of the cathode 10 on the wound outer side, is not particularly limited, and can be arbitrarily set.

In addition, in the end portion of the cathode 10 on the wound outer side, a region where the outer-peripheral-side cathode active material layer 12B is not provided on the outer peripheral surface of the cathode current collector 11, that is, a position of the end portion of the outer-peripheral-side cathode active material layer 12B of the cathode 10 on the wound outer side, is not particularly limited, and can be arbitrarily set.

Here, the end portion of the inner-peripheral-side cathode active material layer 12A on the wound outer side is positioned outside the end portion of the outer-peripheral-side cathode active material layer 12B on the wound outer side, for example.

Meanwhile, the inner-peripheral-side cathode active material layer 12A is not provided on the inner peripheral surface of the cathode current collector 11 and the outer-peripheral-side cathode active material layer 12B is not provided on the outer peripheral surface of the cathode current collector 11, in an end portion of the cathode 10 on a wound inner side, for example. For this reason, the cathode current collector 11 is exposed in the end portion of the cathode 10 on the wound inner side, for example. The "wound inner side" described here is an inner side (a side close to an inner end portion) in the wound direction of the cathode 10, and is a so-called wound core side.

In the end portion of the cathode 10 on the wound inner side, a region where the inner-peripheral-side cathode active material layer 12A is not provided on the inner peripheral surface of the cathode current collector 11, that is, a position of the end portion of the inner-peripheral-side cathode active material layer 12A of the cathode 10 on the wound inner side, is not particularly limited, and can be arbitrarily set.

In addition, in the end portion of the cathode 10 on the wound inner side, a region where the outer-peripheral-side cathode active material layer 12B is not provided on the outer peripheral surface of the cathode current collector 11, that is, a position of the end portion of the outer-peripheral-side cathode active material layer 12B of the cathode 10 on the wound inner side, is not particularly limited, and can be arbitrarily set.

Here, the end portion of the inner-peripheral-side cathode active material layer 12A on the wound inner side is positioned inside the end portion of the outer-peripheral-side cathode active material layer 12B on the wound inner side, for example.

As described above, the anode active material layer 22 is provided only on a part of the anode current collector 21. Thus, the inner-peripheral-side anode active material layer 22A is provided only on a part of the inner peripheral surface of the anode current collector 21, for example, and the outer-peripheral-side anode active material layer 22B is provided only on a part of the outer peripheral surface of the anode current collector 21, for example.

Specifically, the inner-peripheral-side anode active material layer 22A is not provided on the inner peripheral surface of the anode current collector 21 and the outer-peripheral-side anode active material layer 22B is not provided on the outer peripheral surface of the anode current collector 21, in an end portion of the anode 20 on a wound outer side, for example. For this reason, the anode current collector 21 is exposed in the end portion of the anode 20 on the wound outer side, for example.

In the end portion of the anode cathode 20 on the wound outer side, a region where the inner-peripheral-side anode active material layer 22A is not provided on the inner peripheral surface of the anode current collector 21, that is, a position of the end portion of the inner-peripheral-side anode active material layer 22A of the anode 20 on the wound outer side, is not particularly limited, and can be arbitrarily set.

In addition, in the end portion of the anode 20 on the wound outer side, a region where the outer-peripheral-side anode active material layer 22B is not provided on the outer peripheral surface of the anode current collector 21, that is, a position of the end portion of the outer-peripheral-side anode active material layer 22B of the anode 20 on the wound outer side, is not particularly limited, and can be arbitrarily set.

Here, the end portion of the inner-peripheral-side anode active material layer 22A on the wound outer side is positioned inside the end portion of the outer-peripheral-side anode active material layer 22B on the wound outer side, for example.

Meanwhile, the inner-peripheral-side anode active material layer 22A is not provided on the inner peripheral surface of the anode current collector 21 and the outer-peripheral-side anode active material layer 22B is not provided on the outer peripheral surface of the anode current collector 21, in an end portion of the anode 20 on a wound inner side, for example. For this reason, the anode current collector 21 is exposed in the end portion of the anode 20 on the wound inner side, for example.

In the end portion of the anode 20 on the wound inner side, a region where the inner-peripheral-side anode active material layer 22A is not provided on the inner peripheral surface of the anode current collector 21, that is, a position of the end portion of the inner-peripheral-side anode active material layer 22A of the anode 20 on the wound inner side, is not particularly limited, and can be arbitrarily set.

In addition, in the end portion of the anode 20 on the wound inner side, a region where the outer-peripheral-side anode active material layer 22B is not provided on the outer peripheral surface of the anode current collector 21, that is, a position of the end portion of the outer-peripheral-side anode active material layer 22B of the anode 20 on the wound inner side, is not particularly limited, and can be arbitrarily set.

Here, the end portion of the inner-peripheral-side anode active material layer 22A on the wound inner side is positioned outside the end portion of the outer-peripheral-side anode active material layer 22B on the wound inner side, for example.

The cathode lead 2 is attached to the cathode current collector 11 in the end portion of the cathode 10 on the wound inner side. Here, the cathode lead 2 is provided on the outer peripheral surface of the cathode current collector 11, for example. The cathode lead 2 may be provided on the inner peripheral surface of the cathode current collector 11. A method of attaching the cathode lead 2 to the cathode current collector 11 is not particularly limited, and is a welding method, for example.

The anode lead 3 is attached to the anode current collector 21 in the end portion of the anode 20 on the wound inner side. Here, the anode lead 3 is attached to the outer peripheral surface of the anode current collector 21, for example. The anode lead 3 may be provided on the inner peripheral surface of the anode current collector 21. The anode lead 3 is disposed so as not to overlap with the cathode lead 2 in the minor axis (Y axis) direction. A method of attaching the anode lead 3 to the anode current collector 21 is similar to the method of attaching the cathode lead 2 to the cathode current collector 11, for example.

For example, a winding stop tape 58 is attached to the cathode current collector 11 in the end portion of the cathode 10 on the wound outer side. Here, the winding stop tape 58 is attached to the outer peripheral surface of the cathode current collector 11, for example. Accordingly, the cathode current collector 11 in the end portion of the cathode 10 on the wound outer side is fixed to a main body of the wound electrode body 100. The winding stop tape 58 is an adhesive tape or the like, for example.

For example, a protective tape 50 is attached to each of the cathode 10 and the anode 20. The protective tape 50 contains any one or more kinds of insulating polymer compound or the like, for example. The kind of the insulating polymer compound is not particularly limited, and is polypropylene (PP) or the like, for example. A thickness of the protective tape 50 is not particularly limited, and is 5 μm to 40 μm, for example.

The number of the protective tape 50 is not particularly limited, and may be one or more. Here, seven protective tapes 50 (50A to 50G) are used, for example. Details of an attachment position of each of the protective tapes 50 A to 50G are described below, for example.

The protective tape 50A is used to mainly cover (protect) the end portion (corner portion) of the inner-peripheral-side cathode active material layer 12A of the cathode 10 on the wound outer side and the periphery thereof to prevent a defect caused by the corner portion. That is, the protective tape 50 is used to cover the cathode current collector 11 together with the inner-peripheral-side cathode active material layer 12A, for example.

Specifically, when the corner portion of the inner-peripheral-side cathode active material layer 12A is exposed, the corner portion tends to easily bite into the anode 20 (outer-peripheral-side anode active material layer 22) and the like through the separator 30. Thus, the corner portion may deform or break the anode 20. The term, "break" causes a phenomenon in which a crack occurs in the anode 20 or each of the anode 20 and the separator 30 is cut, for example. In this case, the separator 30 may be deformed or damaged along with the anode 20.

In contrast, when the corner portion of the inner-peripheral-side cathode active material layer 12A is covered with the protective tape 50A, the sharpness of the corner portion is reduced by the protective tape 50A to cause the corner portion to be less likely to bite into the anode 20. This reduces influence of the corner portion, so that the anode 20 as well as the separator 30 is less likely to be deformed or broken.

An installation range of the protective tape 50A can be arbitrarily set, and thus can be expanded to one or both of the wound inner side and the wound outer side. FIG. 2 illustrates the protective tape 50A that has an installation range expanded to the wound outer side to cause the inner peripheral surface of the cathode current collector 11 to be covered with the protection tape 50A in a wide range, for example.

The protective tape 50B is used to mainly cover the end portion (corner portion) of the outer-peripheral-side cathode active material layer 12B of the cathode 10 on the wound outer side and the periphery thereof to prevent a defect caused by the corner portion.

An installation range of the protective tape 50B can be arbitrarily set, and thus can be expanded to one or both of the wound inner side and the wound outer side. FIG. 2 illustrates the protective tape 50B that has an installation range expanded to the wound outer side to cause the outer peripheral surface of the cathode current collector 11 to be covered with the protection tape 50B in a wide range, for example.

The protective tape 50C is used to mainly cover the end portion (corner portion) of the outer-peripheral-side cathode active material layer 12B of the cathode 10 on the wound inner side and the periphery thereof to prevent a defect caused by the corner portion.

An installation range of the protective tape 50C can be arbitrarily set, and thus can be expanded to one or both of the wound inner side and the wound outer side. FIG. 2 illustrates the protective tape 50C that has an installation range expanded to the wound inner side to cause the outer peripheral surface of the cathode current collector 11 to be covered with the protection tape 50C in a wide range, for example.

The protective tape 50D is used to mainly cover the end portion (corner portion) of the inner-peripheral-side cathode active material layer 12A of the cathode 10 on the wound inner side and the periphery thereof to prevent a defect caused by the corner portion.

An installation range of the protective tape 50D can be arbitrarily set, and thus can be expanded to one or both of the wound inner side and the wound outer side. FIG. 2 illustrates the protective tape 50D that has an installation range expanded to the wound inner side to cause the inner peripheral surface of the cathode current collector 11 to be covered with the protection tape 50D in a wide range, for example. Here, an installation range of the protection tape 50D is expanded to a region overlapping with the cathode lead 2 and the periphery of the region, for example.

The protective tape 50E is a cathode terminal protecting member that is used to mainly cover the cathode lead 2 and the periphery thereof to prevent a defect caused by an end portion (corner portion) of the cathode lead 2. That is, the protective tape 50E is used to cover the cathode current collector 11 together with the cathode lead 2, for example. The reason why the defect is caused by the corner portion of the cathode lead 2 is similar to the reason why the defect is caused by the corner portion of the inner-peripheral-side cathode active material layer 12A.

An installation range of the protective tape 50E can be arbitrarily set, and thus can be expanded to one or both of the wound inner side and the wound outer side. FIG. 2 illustrates the protective tape 50E that has an installation range expanded to the wound outer side to cause the outer peripheral surface of the cathode current collector 11 to be covered with the protection tape 50E in a wide range, for example. Here, the protective tape 50E is connected (integrated) with the protective tape 50C, for example.

The protective tape 50F is an anode terminal protecting member that is used to mainly cover the anode lead 3 and the periphery thereof to prevent a defect caused by an end portion (corner portion) of the anode lead 3. That is, the protective tape 50F is used to cover the anode current collector 21 together with the anode lead 3, for example.

An installation range of the protective tape 50F can be arbitrarily set, and thus can be expanded to one or both of the wound inner side and the wound outer side.

The protective tape 50G is used to mainly cover a region overlapping with the anode lead 3 and the periphery thereof in the anode current collector 21 in the end portion of the anode 20 on the wound inner side to prevent a defect caused by the corner portion of the anode lead 3, as with the protective tape 50F described above.

An installation range of the protective tape 50G can be arbitrarily set, and thus can be expanded to one or both of the wound inner side and the wound outer side.

As illustrated in FIG. 4, the cathode 10 is wound around the winding axis J as a center. Thus, the cathode 10 includes a plurality of major-axis-direction extending portions 10A that are a part of the cathode 10, and a plurality of minor-axis-direction extending portions 10B that are the other part of the cathode 10. That is, the cathode 10 has a structure in which the plurality of major-axis-direction extending portions 10A and the plurality of minor-axis-direction extending portions 10B are alternately connected to each other. "The plurality of major-axis-direction extending portions 10A" each extends in the major axis (X axis) direction in the cathode 10 wound around the winding axis J. "The plurality of minor-axis-direction extending portions 10B" each extends in the minor axis (Y axis) direction in the cathode 10.

FIG. 4 illustrates the plurality of major-axis-direction extending portions 10A with solid lines and the plurality of minor-axis-direction extending portions 10B with broken lines to facilitate distinction between the plurality of major axis extending portions 10A and the plurality of minor-axis-direction extending portions 10B. For simple illustration, each of the plurality of minor-axis-direction extending portions 10B is illustrated linearly. As is apparent from FIG. 2, each of the plurality of minor-axis-direction extending portions 10B is actually in a curved shape.

As illustrated in FIG. 4, the anode 20 is wound around the winding axis J, so that the anode 20 has a structure similar to that of the above-described cathode 10. That is, the anode 20 includes a plurality of major-axis-direction extending portions 20A and a plurality of minor-axis-direction extending portions 20B, and has a structure in which the plurality of major-axis-direction extending portions 20A and the plurality of minor-axis-direction extending portions 20B are alternately connected to each other. The plurality of major-axis-direction extending portions 20A and the plurality of minor-axis-direction extending portions 20B have details similar to details of the plurality of major-axis-direction extending portions 10A and the plurality of minor-axis-direction extending portions 10B, except for being a part of the anode 20, for example.

FIG. 4 illustrates the plurality of major-axis-direction extending portions 20A with solid lines and the plurality of minor-axis-direction extending portions 20B with broken lines as with the illustration of the plurality of major axis extending portions 10A and the plurality of minor-axis-direction extending portions 10B. For simple illustration, each of the plurality of minor-axis-direction extending portions 20B is illustrated linearly, but is actually in a curved shape.

As illustrated in FIGS. 2, 4 and 5, the cathode 10 (the plurality of the major-axis-direction extending portions 10A) and the anode 20 (the plurality of the major-axis-direction extending portions 20A) include corresponding six portions distinguished according to a wound position, which are disposed near the winding axis J. The six portions include a first cathode wound portion 10X and a second cathode wound portion 10Y serving as a part (the major axis extending portion 10A) of the cathode 20A, and a first anode wound portion 20X, a second anode wound portion 20Y, a third anode wound portion 20Z, and a fourth anode wound portion 20W serving as a part of the anode 20.

Specifically, the cathode 10 is provided in its end portion on the wound inner side with the first cathode wound portion 10X extending in the major axis direction, and the cathode lead 2 is attached to the first cathode wound portion 10X. In the first cathode wound portion 10X, the inner-peripheral-side cathode active material layer 12A is not provided on the inner peripheral surface of the cathode current collector 11, and the outer-peripheral-side cathode active material layer 12B is not provided on the outer peripheral surface of the cathode current collector 11, for example.

As described herein, the protective tape 50D is attached to the first cathode wound portion 10X on its inner peripheral side, for example, and as described above, the protective tape 50E is attached to the first cathode wound portion 10X on its outer peripheral side, for example.

In addition, the cathode 10 includes the second cathode wound portion 10Y that is disposed outside the first cathode wound portion 10X and extends in the major axis direction, for example, The second cathode wound portion 10Y faces the first cathode wound portion 10X across the separator 30, for example. In the second cathode wound portion 10Y, the inner-peripheral-side cathode active material layer 12A is provided on a part of the inner peripheral surface of the cathode current collector 11, and the outer-peripheral-side cathode active material layer 12B is provided on a part of the outer peripheral surface of the cathode current collector 11, for example.

As described above, the protective tape 50D is attached to the second cathode wound portion 10Y on its inner peripheral side, for example, and as described above, the protective tape 50C is attached to the second cathode wound portion 10Y on its outer peripheral side, for example.

Meanwhile, the anode 20 is provided in its end portion on the wound inner side with the first anode wound portion 20X extending in the major axis direction, and the anode lead 3 is attached to the first anode wound portion 20X. The first anode wound portion 20X faces the first cathode wound portion 10X across the separator 30. In the first anode wound portion 20X, the inner-peripheral-side anode active material layer 22A is not provided on the inner peripheral surface of the anode current collector 21 and the outer-peripheral-side anode active material layer 22B is provided on the outer peripheral surface of the anode current collector 21, for example.

As described above, the protective tape 50F is attached to the first anode wound portion 20X on its outer peripheral side, for example.

In addition, the anode 20 includes the second anode wound portion 20Y that is disposed outside the first anode wound portion 20X and extends in the major axis direction. The second anode wound portion 20Y faces the first anode wound portion 20X across the separator 30, for example. In the second anode wound portion 20Y, the inner-peripheral-side anode active material layer 22A is not provided in the anode current collector 21 on its inner peripheral side and the outer-peripheral-side anode active material layer 22B is provided on the outer peripheral surface of the anode current collector 21, for example.

In addition, the anode 20 includes the third anode wound portion 20Z that is disposed outside the second anode wound portion 20Y and extends in the major axis direction. The third anode wound portion 20Z faces the second anode wound portion 20Y across the separator 30, for example. In the third anode wound portion 20Z, the inner-peripheral-side anode active material layer 22A is provided on the inner peripheral surface of the anode current collector 21 and the outer-peripheral-side anode active material layer 22B is provided on the outer peripheral surface of the anode current collector 21, for example.

As described herein, the protective tape 50G is attached to the third anode wound portion 20Z on its inner peripheral side, for example.

In addition, the anode 20 includes the fourth anode wound portion 20W that is disposed inside the first anode wound portion 20X and extends in the major axis direction. The fourth anode wound portion 20W faces the first anode wound portion 20X across the separator 30, for example. In the fourth anode wound portion 20W, the inner-peripheral-side anode active material layer 22A is not provided on the inner peripheral surface of the anode current collector 21 and the outer-peripheral-side anode active material layer 22B is not provided on the outer peripheral surface of the anode current collector 21, for example.

A step reducing tape 40 is attached to the cathode 10 and the anode 20, along with the protective tape 50 described above.

The step reducing tape 40 is a step reducing member that mainly reduces influence of a step generated by providing each of the cathode lead 2 and the anode lead 3 to lead the wound electrode body 100 to be flat in shape (flat shape) as much as possible. Use of this step reducing tape 40 facilitates charge and discharge reaction between the cathode 10 and the anode 20 to improve battery characteristics.

Specifically, the cathode lead 2 attached to the cathode 10 (the cathode current collector 11) causes a step, and the anode lead 3 attached to the anode 20 (the anode current collector 21) causes a step.

In the cathode 10 and the anode 20 to which the step reducing tape 40 is not provided, the above-mentioned steps affect a wound state of the cathode 10 and the anode 20 when the cathode 10 and the anode 20 are wound in the manufacturing process of the wound electrode body 100. As a result, the steps cause the wound electrode body 100 to tend to be distorted.

Specifically, while wound strength of the cathode 10 and the anode 20 unintentionally increases in a region near each of the cathode lead 2 and the anode lead 3, the wound strength of the cathode 10 and the anode 20 unintentionally decreases in other regions. The sentence, "wound strength increases", means that the cathode 10 and the anode 20 are tightly wound, and the sentence, "wound strength decreases", means that the cathode 10 and the anode 20 are loosely wound. Thus, the difference in a wound state described above causes a distance (charging and discharging distance) between the cathode 10 and the anode 20 to tend to vary, so that the amount of charge and the amount of discharge at the time of charging and discharging tend to vary.

In the region near each of the cathode lead 2 and the anode lead 3, even if wound strength of the cathode 10 and the anode 20 is initially high, winding of the cathode 10 and the anode 20 loosens as charging and discharging are repeated. As a result, the wound strength varies. In this case, continuous use of the secondary battery causes a charging and discharging distance to tend to vary, so that the amount of charge and the amount of discharge also tend to fluctuate.

These facts cause the charging and discharging reaction between the cathode 10 and the anode 20 to be difficult to proceed smoothly and stably, so that the amount of charge and the amount of discharge tend to vary and fluctuate. As a result, battery characteristics are deteriorated.

In contrast, in the cathode 10 and the anode 20 to which the step reducing tape 40 is attached, influence of the step, on the wound state of the cathode 10 and the anode 20, is reduced, as described above. This leads the wound electrode body 100 to be more flat in shape (flat shape) as compared with the cathode 10 and the anode 20 provided with no step reducing tape 40, when the cathode 10 and the anode 20 are wound in the manufacturing process of the wound electrode body 100. As a result, the wound electrode body 100 is less likely to be distorted.

In this case, the wound strength of each of the cathode 10 and the anode 20 becomes substantially uniform regardless of whether or not the regions are near the corresponding cathode lead 2 and anode lead 3. This causes the charging and discharging distance to be less likely to vary, so that the amount of charging and the amount of discharging are each less likely to vary at the time of charging and discharging.

In addition, the wound strength of each of the cathode 10 and the anode 20 is substantially uniform, so that the wound strength is less likely to fluctuate even when charging and discharging are repeated. This causes the charging and discharging distance to be less likely to vary even when the secondary battery is continuously used. As a result, the amount of charging and the amount of discharging are each less likely to fluctuate.

These facts cause the charging and discharging reaction between the cathode 10 and the anode 20 to tend to proceed smoothly and stably, so that the amount of charge and the amount of discharge are each stabilized. As a result, battery characteristics are improved.

The step reducing tape 40 contains any one or more kinds of insulating polymer compound or the like, for example. The kind of the insulating polymer compound is not particularly limited, and is polypropylene (PP), polyethylene terephthalate (PET), polyimide (PI), or the like. This is because insulating properties of the step reducing tape 40 is secured.

The step reducing tape 40 is not particularly limited in form as long as it can be fixed to each of the cathode 10 and the anode 20.

Specifically, the step reducing tape 40 may be an adhesive tape with an adhesive layer, or a non-adhesive tape without the adhesive layer. The step reducing tape 40 serving as a non-adhesive tape is bonded to the cathode 10 and the anode 20 with an adhesive, for example. The step reducing tape 40 may be a film having flexibility or a sheet having rigidity.

The step reducing tape 40 is not particularly limited in thickness, and preferably has a thickness that is not too thin as well as that is equal to or less than a thickness of each of the cathode lead 2 and the anode lead 3. This is because the step reducing tape 40 having an extremely thin thickness causes influence of the step, on a wound state of the cathode 10 and the anode 20, to be less likely to be reduced. Meanwhile, the step reducing tape 40 having a thickness more than the thicknesses of each of the cathode lead 2 and the anode lead 3 may contrarily increase the influence of the step on the wound state of the cathode 10 and the anode 20.

Specifically, it is preferable that a ratio T of a thickness T2 of the step reducing tape 40 to a thickness T1 of each of the cathode lead 2 and the anode lead 3 is 15% to 80%. This is because the influence of the step, on the wound state of the cathode 10 and the anode 20, is sufficiently reduced. The ratio T is calculated as follows: the ratio T (%)=(thickness T2/thickness T1)×100. A value of (thickness T2/thickness T1) is acquired by rounding a second decimal place value.

More specifically, the thickness T1 is 50 μm to 100 μm, for example, and the thickness T2 is 8 μm to 80 μm, for example.

The step reducing tape 40 is not particularly limited in width. In particular, when the step reducing tape 40 is disposed in a third region R3 (refer to FIG. 5) described later, it is preferable that the step reducing tape 40 has a width that is not too small as well as that is sufficiently smaller than a distance between the cathode lead 2 and the anode lead 3. This is because the step reducing tape 40 having an extremely small width causes influence of the step, on a wound state of the cathode 10 and the anode 20, to be less likely to be reduced. Meanwhile, the step reducing tape 40 having a width that is not sufficiently smaller than the distance between the cathode lead 2 and the anode lead 3 may contrarily increase the influence of the step on the wound state of the cathode 10 and the anode 20.

Specifically, a ratio W of a width W2 of the step reducing tape 40 to a distance W1 between the cathode lead 2 and the anode lead 3 is preferably 50% to 90%. This is because the influence of the step, on the wound state of the cathode 10 and the anode 20, is sufficiently reduced. The ratio W is calculated as follows: the ratio W (%)=(width W2/distance W1)×100. A value of (width W2/distance W1) is acquired by rounding a second decimal place value.

More specifically, the distance W1 is 8 mm to 30 mm, for example, and the width W2 is 4 mm to 27 mm, for example.

The step reducing tape 40 is not particularly limited in height, and preferably has a height that is not too small as well as that is not extremely more than a height of each of the cathode current collector 11 and the anode current collector 21. This is because the step reducing tape 40 having an extremely small height causes influence of the step, on a wound state of the cathode 10 and the anode 20, to be less likely to be reduced. Meanwhile, the step reducing tape 40 having a height extremely more than the height of each of the cathode current collector 11 and the anode current collector 21 may contrarily increase the influence of the step on the wound state of the cathode 10 and the anode 20.

Specifically, a ratio H of a height H2 of the step reducing tape 40 to a height H1 of each of the cathode current collector 11 and the anode current collector 21 is preferably 20% to 105%. This is because the influence of the step, on the wound state of the cathode 10 and the anode 20, is sufficiently reduced. The ratio H is calculated as follows: the ratio H (%)=(height H2/height H1)×100. A value of (height H2/height H1) is acquired by rounding a second decimal place value.

More specifically, the height H1 is 30 mm to 180 mm, for example, and the height H2 is 6 mm to 189 mm, for example.

The number of step reducing tapes 40 to be attached may be one or more. As the number of the step reducing tapes 40 to be attached increases, the influence of the step, on the wound state of the cathode 10 and the anode 20, tends to be more easily reduced.

When the number of step reducing tapes 40 is two or more, the two or more step reducing tapes 40 may be identical to each other or different from each other, in material, form, and size. As a matter of course, the two or more step reducing tapes 40 may be identical to each other only in any two or more of material, form, and size.

Details of an attachment position of the step reducing tape 40 are as described below. FIG. 5 illustrates a case where the step reducing tapes 40 are attached to all respective candidate attachment positions to make it easy to understand a series of attachment positions of the respective step reducing tapes 40. Thus, it is not necessary to attach the step reducing tapes 40 at all respective attachment positions to be described below with reference to FIG. 5 according to an embodiment.

The step reducing tape 40 is attached to one of or both of the first cathode wound portion 10X and the first anode wound portion 20X in one or more of a first region R1, a second region R2, and a third region R3.

Thus, the step reducing tape 40 may be attached only to the first region R1, only to the second region R2, or only to the third region R3. The step reducing tape 40 also may be attached to each of the first region R1 and the second region R2, to each of the second region R2 and the third region R3, or to each of the first region R1 and the third region R3. In addition, the step reducing tape 40 may be attached to each of the first region R1, the second region R2, and the third region R3.

The step reducing tape 40 may be attached only to the first cathode wound portion 10X, only to the first anode wound portion 20X, or to each of the first cathode wound portion 10X and the first anode wound portion 20X.

When the step reducing tape 40 is attached to the first cathode wound portion 10X, the step reducing tape 40 may be attached only to the inner peripheral side thereof, only to the outer peripheral side thereof, or to each of the inner peripheral side and the outer peripheral side.

When the step reducing tape 40 is attached to the first anode wound portion 20X, the step reducing tape 40 may be attached only to the inner peripheral side thereof, only to the outer peripheral side thereof, or to each the inner peripheral side and the outer peripheral side.

As a matter of course, the number of step reducing tapes 40 to be attached may be one or more as described above. As a specific example of the step reducing tape 40, step reducing tapes 40A to 40I will be described below. All of the step reducing tapes 40A to 40I do not need to be attached, and thus at least one of the step reducing tapes 40A to 40I needs to be attached.

Specifically, the step reducing tape 40 (40A to 40D) is attached to the first cathode wound portion 10X to which the cathode lead 2 is attached. Here, the first cathode wound portion 10X extends to the second region R2 via the first region R1, for example.

In the first cathode wound portion 10X, the inner-peripheral-side cathode active material layer 12A is not provided on the inner peripheral surface of the cathode current collector 11, and the outer-peripheral-side cathode active material layer 12B is not provided on the outer peripheral surface of the cathode current collector 11, for example.

Accordingly, the cathode current collector 11 in the first cathode wound portion 10X includes a first cathode exposed portion 11XP in which the inner-peripheral-side cathode active material layer 12A and the outer-peripheral-side cathode active material layer 12B are not provided, for example, so that the step reducing tape 40 is attached to the first cathode exposed portion 11XP, for example.

That is, the step reducing tape 40A is attached to an inner peripheral surface of the first cathode exposed portion 11XP in the first region R1. When the protective tape 50D is attached to an exposed inner peripheral surface of the first cathode exposed portion 11XP, the step reducing tape 40A may be attached onto the protective tape 50D.

The step reducing tape 40B is attached to an outer peripheral surface of the first cathode exposed portion 11XP in the first region R1. When the protective tape 50E is attached to an exposed outer peripheral surface of the first cathode exposed portion 11XP, the step reducing tape 40B may be attached onto the protective tape 50E.

The step reducing tape 40C is attached to the inner peripheral surface of the first cathode exposed portion 11XP in the second region R2. When the protective tape 50D is attached to the inner peripheral surface of the first cathode exposed portion 11XP, the step reducing tape 40C may be attached onto the protective tape 50D. The inner peripheral surface of the first cathode exposed portion 11XP may be covered with the step reducing tape 40C together with the protective tape 50D, for example.

The step reducing tape 40D is attached to the outer peripheral surface of the first cathode exposed portion 11XP in the second region R2. When the protective tape 50E is attached to an exposed outer peripheral surface of the first cathode exposed portion 11XP, the step reducing tape 40D may be attached onto the protective tape 50E. The outer peripheral surface of the first cathode exposed portion 11XP may be covered with the step reducing tape 40D together with the protective tape 50E, for example.

In addition, the step reducing tapes 40 (40E to 40I) are attached to the first anode wound portion 20X to which the anode lead 3 is attached. Here, the first anode wound portion 20X extends from the first region R1 to the third region R3 via the second region R2, for example.

In the first anode wound portion 20X, the inner-peripheral-side anode active material layer 22A is not provided on the inner peripheral surface of the anode current collector 21 and the outer-peripheral-side anode active material layer 22B is provided on a part (first region R1) of the outer peripheral surface of the anode current collector 21, for example. Accordingly, the cathode current collector 21 in the first anode wound portion 20X includes a first anode exposed portion 21XP in which the inner-peripheral-side anode active material layer 22A and the outer-peripheralside anode active material layer 22B are not provided, for example, so that the step reducing tapes 40 are attached to the first anode exposed portion 21XP, for example.

That is, the step reducing tape 40E is attached to an inner peripheral surface of the first anode exposed portion 21XP in the first region R1.

The step reducing tape 40F is attached to the inner peripheral surface of the first anode exposed portion 21XP in the second region R2.

The step reducing tape 40G is attached to the outer peripheral surface of the first anode exposed portion 21XP in the second region R2. When the protective tape 50F is attached to the outer peripheral surface of the first anode exposed portion 21XP, the step reducing tape 40G may be attached onto the protective tape 50F.

The step reducing tape 40H is attached to the inner peripheral surface of the first anode exposed portion 21XP in the third region R3.

The step reducing tape 40I is attached to the outer peripheral surface of the first anode exposed portion 21XP in the third region R3. When the protective tape 50F is attached to the outer peripheral surface of the first anode exposed portion 21XP, the step reducing tape 40I may be attached onto the protective tape 50F.

Here, the step reducing tape 40 is attached to one or both of the first cathode wound portion 10X and the first anode wound portion 20X, because the cathode lead 2 is attached to the first cathode wound portion 10X and the anode lead 3 is attached to the first anode wound portion 20X. That is, when the step reducing tape 40 is attached to the first cathode wound portion 10X itself where a step is generated, influence caused by the cathode lead 2 (step) tends to be effectively reduced by using the step reducing tape 40. In addition, when the step reducing tape 40 is attached to the first anode wound portion 20X itself where a step is generated, influence caused by the anode lead 3 (step) tends to be effectively reduced by using the step reducing tape 40.

The step reducing tape 40 may be further attached to one or more of a series of attachment positions described below, along with the above-described series of attachment positions. This is because influence of the step, on the wound state of the cathode 10 and the anode 20, is more reduced to further improve battery characteristics.

First, the step reducing tape 40 (40R, 40S) may be attached to the second cathode wound portion 10Y, for example. The step reducing tape 40 may be attached to one or both of the inner peripheral side and the outer peripheral side of the second cathode wound portion 10Y. Here, the second cathode wound portion 10Y extends from the first region R1 to the third region R3 via the second region R2, for example.

In the second cathode wound portion 10Y, the inner-peripheral-side cathode active material layer 12A is provided on a part (the second region R2 and the third region R3) of the inner peripheral surface of the cathode current collector 11, and the outer-peripheral-side cathode active material layer 12B is provided on a part (the second region R2 and the third region R3) of the outer peripheral surface of the cathode current collector 11, for example. Accordingly, the cathode current collector 11 in the second cathode wound portion 10Y includes a second cathode exposed portion 11YP in which the inner-peripheral-side cathode active material layer 12A and the outer-peripheral-side cathode active material layer 12B are not provided, for example, so that the step reducing tape 40 is attached to the second cathode exposed portion 11YP, for example.

That is, the step reducing tape 40R may be attached to an inner peripheral surface of the second cathode exposed portion 11XP in the first region R1. When the protective tape 50D is attached to the inner peripheral surface of the second cathode exposed portion 11XP, the step reducing tape 40R may be attached onto the protective tape 50D. The step reducing tape 40S may be attached to an outer peripheral surface of the second cathode exposed portion 11XP in the first region R1. When the protective tape 50C is attached to the outer peripheral surface of the first cathode exposed portion 11XP, the step reducing tape 40S may be attached onto the protective tape 50C.

Second, the step reducing tape 40 (40L to 40N) may be attached to the second anode wound portion 20Y, for example. The step reducing tape 40 may be attached to one or both of the inner peripheral side and the outer peripheral side of the second anode wound portion 20Y. Here, the second anode wound portion 20Y extends from the first region R1 to the third region R3 via the second region R2, for example.

In the second anode wound portion 20Y, the inner-peripheral-side anode active material layer 22A is not provided on the inner peripheral surface of the anode current collector 21 and the outer-peripheral-side anode active material layer 22B is provided on the outer peripheral surface of the anode current collector 21, for example. Accordingly, the anode current collector 21 in the second anode wound portion 20Y includes a second anode exposed portion 21YP in which the inner-peripheral-side anode active material layer 22A and the outer-peripheral-side anode active material layer 22B are not provided, for example, so that the step reducing tape 40 is attached to the second anode exposed portion 21YP, for example.

That is, the step reducing tape 40L may be attached to an inner peripheral surface of the second anode exposed portion 21YP in the first region R1. The step reducing tape 40M is attached to the inner peripheral surface of the second anode exposed portion 21YP in the second region R2, for example. The step reducing tape 40N is attached to the inner peripheral surface of the second anode exposed portion 21YP in the third region R3, for example.

Third, the step reducing tape 40 (40P, 40Q) may be attached to the third anode wound portion 20Z, for example. The step reducing tape 40 may be attached to one or both of the inner peripheral side and the outer peripheral side of the third cathode wound portion 20Z. Here, the third anode wound portion 20Z extends from the first region R1 to the third region R3 via the second region R2, for example.

In the third anode wound portion 20Z, the inner-peripheral-side anode active material layer 22A is provided on a part (first region R1) of the inner peripheral surface of the anode current collector 21 and the outer-peripheral-side anode active material layer 22B is provided on the outer peripheral surface of the anode current collector 21, for example. Accordingly, the anode current collector 21 in the third anode wound portion 20Z includes a third anode exposed portion 21ZP in which the inner-peripheral-side anode active material layer 22A and the outer-peripheral-side anode active material layer 22B are not provided, so that the step reducing tape 40 is attached to the third anode exposed portion 21ZP, for example.

That is, the step reducing tape 40P may be attached to an inner peripheral surface of the third anode exposed portion 21ZP in the second region R2. The step reducing tape 40Q may be attached to the inner peripheral surface of the third anode exposed portion 21ZP in the third region R3.

Fourth, the step reducing tape 40 (40J, 40K) may be attached to the fourth anode wound portion 20W, for example. The step reducing tape 40 may be attached to one or both of the inner peripheral side and the outer peripheral side of the fourth anode wound portion 20W. Here, the fourth anode wound portion 20W extends in the third region R3, for example.

In the fourth anode wound portion 20W, the inner-peripheral-side anode active material layer 22A is not provided on the inner peripheral surface of the anode current collector 21 and the outer-peripheral-side anode active material layer 22B is not provided on the outer peripheral surface of the anode current collector 21, for example. Accordingly, the anode current collector 21 in the fourth anode wound portion 20W includes a fourth anode exposed portion 21WP in which the inner-peripheral-side anode active material layer 22A and the outer-peripheral-side anode active material layer 22B are not provided, for example, so that the step reducing tape 40 is attached to the fourth anode exposed portion 21WP, for example.

That is, the step reducing tape 40J may be attached to an inner peripheral surface of the fourth anode exposed portion 21WP in the third region R3. The step reducing tape 40K may be attached to the outer peripheral surface of the fourth anode exposed portion 21WP in the third region R3, for example.

As a matter of course, the step reducing tape 40 may be attached only to any one of the second cathode wound portion 10Y, the second anode wound portion 20Y, the third anode wound portion 20Z, and the fourth anode wound portion 20W, or may be attached to any two or more of the second cathode wound portion 10Y, the second anode wound portion 20Y, the third anode wound portion 20Z, and the fourth anode wound portion 20W.

Here, the step reducing tape 40 is attached to each of the second cathode wound portion 10Y, the second anode wound portion 20Y, the third anode wound portion 20Z, and the fourth anode wound portion 20W, because each of the second cathode wound portion 10Y, the second anode wound portion 20Y, the third anode wound portion 20Z, and the fourth anode wound portion 20W is disposed near the winding axis J, being connected to the corresponding one of the first cathode wound portion 10X and the first anode wound portion 20X. That is, when the step reducing tape 40 is attached to each of the second cathode wound portion 10Y, the second anode wound portion 20Y, the third anode wound portion 20Z, and the fourth anode wound portion 20W, which are disposed near the corresponding one of the cathode lead 2 and the anode lead 3, influence caused by a step can be easily reduced.

Operation of the secondary battery will be described according to an embodiment. The secondary battery operates as follows.

At the time of charging, lithium ions are released from the cathode 10 and the lithium ions are stored in the anode 20 through an electrolytic solution, for example Meanwhile, at the time of discharging, lithium ions are released from the anode 20, and the lithium ions are stored in the cathode 10 through the electrolytic solution, for example.

A manufacturing method of the secondary battery will be described according to an embodiment. The secondary battery is manufactured according to the following procedure, for example.

For preparing the cathode 10, first, a cathode active material and, as needed, a cathode binder, a cathode conductive agent, and the like, are mixed to obtain a cathode mixture. Subsequently, the cathode mixture is dispersed into an organic solvent or the like to obtain a paste-like cathode mixture slurry. Subsequently, the cathode mixture slurry is applied to both surfaces of the cathode current collector 11, and then the cathode mixture slurry is dried to form the cathode active material layer 12 (the inner-peripheral-side cathode active material layer 12A and the outer-peripheral-side cathode active material layer 12B). Finally, the cathode active material layer 12 is compression molded by using a roll press machine or the like. In this case, the cathode active material layer 12 may be heated, or compression molding may be repeated multiple times.

For preparing the anode 20, the anode active material layers 12 (the inner-peripheral-side anode active material layer 12A and the outer-peripheral-side anode active material layer 12B) are formed on both sides of the anode current collector 11 according to a procedure as with the preparing procedure of the cathode 10 described above. Specifically, an anode active material, an anode binder, an anode conductive agent, and the like, are mixed to obtain an anode mixture, and then the anode mixture is dispersed into an organic solvent or the like to obtain a paste-like anode mixture slurry. Subsequently, the anode mixture slurry is applied to both surfaces of the anode current collector 21, and then the anode mixture slurry is dried to form the anode active material layer 22. Finally, the anode active material layer 22 is compression molded by using a roll press machine or the like. As a matter of course, the anode active material layer 22 may be heated, or compression molding may be repeated multiple times.

For preparing an electrolytic solution, an electrolyte salt is added to a solvent, and then the solvent is stirred.

For assembling the secondary battery, first, the cathode lead 2 is attached to the cathode 10 (the cathode current collector 11) by a welding method or the like, and the anode lead 3 is attached to the anode 20 (the anode current collector 21) by the welding method or the like. Subsequently, the step reducing tape 40 and the protective tape 50 are attached to each of the cathode 10 and the anode 20. Subsequently, the cathode 10 and the anode 20 are laminated to each other with the separator 30 interposed therebetween, and then the cathode 10, the anode 20, and the separator 30 are wound around the winding axis J to obtain a wound body. Subsequently, the winding stop tape 58 is attached to a wound end portion of the wound body to fix the wound end portion.

Subsequently, the exterior member 1 is folded so as to sandwich the wound body, and then outer peripheral portions of the exterior member 1 except an outer peripheral portion of one side are bonded by a thermal fusion method or the like to house the wound body inside the exterior member 1 in the shape of a bag. In this case, the wound body is housed inside a recess 1U provided in the exterior member 1. Subsequently, the electrolytic solution is injected into the exterior member 1 in the shape of a bag, and then the exterior member 1 is sealed by a thermal fusion method or the like. As a result, the wound body is impregnated with the electrolytic solution to obtain a wound electrode body 100, and the wound electrode body 100 is enclosed in the exterior member 1. In this case, an adhesive film 4 is inserted between the exterior member 1 and the cathode lead 2, and an adhesive film 5 is inserted between the exterior member 1 and the anode lead 3.

Finally, the exterior member 1 with the wound electrode body 100 enclosed is compressed while being heated so as to mold the wound electrode body 100 in a flat shape. In this case, the exterior member 1 may be heated. As a result, the secondary battery of a laminate film type is completed.

According to this secondary battery, the step reducing tape 40 (40A to 40I) is attached to one or both of the first cathode wound portion 10X and the first anode wound portion 20X in one or more regions of the first region R1, the second region R2, and the third region R3. In this case, even when the cathode lead 2 (step) is provided in the first cathode wound portion 10X and the anode lead 3 (step) is provided in the first anode wound portion 20X as described above, influence of the step, on a wound state of the cathode 10 and the anode 20, is reduced. As a result, the wound electrode body 100 is less likely to be distorted in shape (flat shape). This causes charging and discharging reaction to tend to proceed smoothly and stably between the cathode 10 and the anode 20 even when the secondary battery is continuously used. As a result, each of the amount of charge and the amount of discharge is stabilized. This enables battery characteristics to be improved.

In particular, when the step reducing tape 40 is attached to one or both of the inner peripheral side and the outer peripheral side of the first cathode wound portion 10X, the influence of the step, on the wound state of the cathode 10 and the anode 20, tends to be reduced to enable a higher effect to be obtained. When the step reducing tape 40 is attached to one or both of the inner peripheral side and the outer peripheral side of the first anode wound portion 20X, the influence of the step, on the wound state of the cathode 10 and the anode 20, tends to be reduced to enable a higher effect to be obtained.

In addition, when the step reducing tape 40 (40J to 40N, 40P to 40S) is attached to one or more of the second cathode wound portion 10Y, the second anode wound portion 20Y, the third anode wound portion 20Z, and the fourth anode wound portion 20W, the influence of the step, on the wound state of the cathode 10 and the anode 20, is further reduced to enable a higher effect to be obtained.

Use of the protective tape 50 (50A to 50G) together with the step reducing tape 40 causes charging and discharging reaction between the cathode 10 and the anode 20 to tend to proceed smoothly and stably while suppressing deformation or breakage of each of the cathode 10, the anode 20, and the separator 30, so that a higher effect can be obtained.

A ratio T of 15% to 80%, a ratio W of 50% to 90%, and a ratio H of 20% to 105% sufficiently reduce the influence of the step on the wound state of the cathode 10 and the anode 20, so that a higher effect can be obtained.

The step reducing tape 40 containing polypropylene or the like secures insulating properties of the step reducing tape 40, so that a higher effect can be obtained.

The configuration of the above-described secondary battery can be changed as appropriate according to other embodiments.

Figure 6:
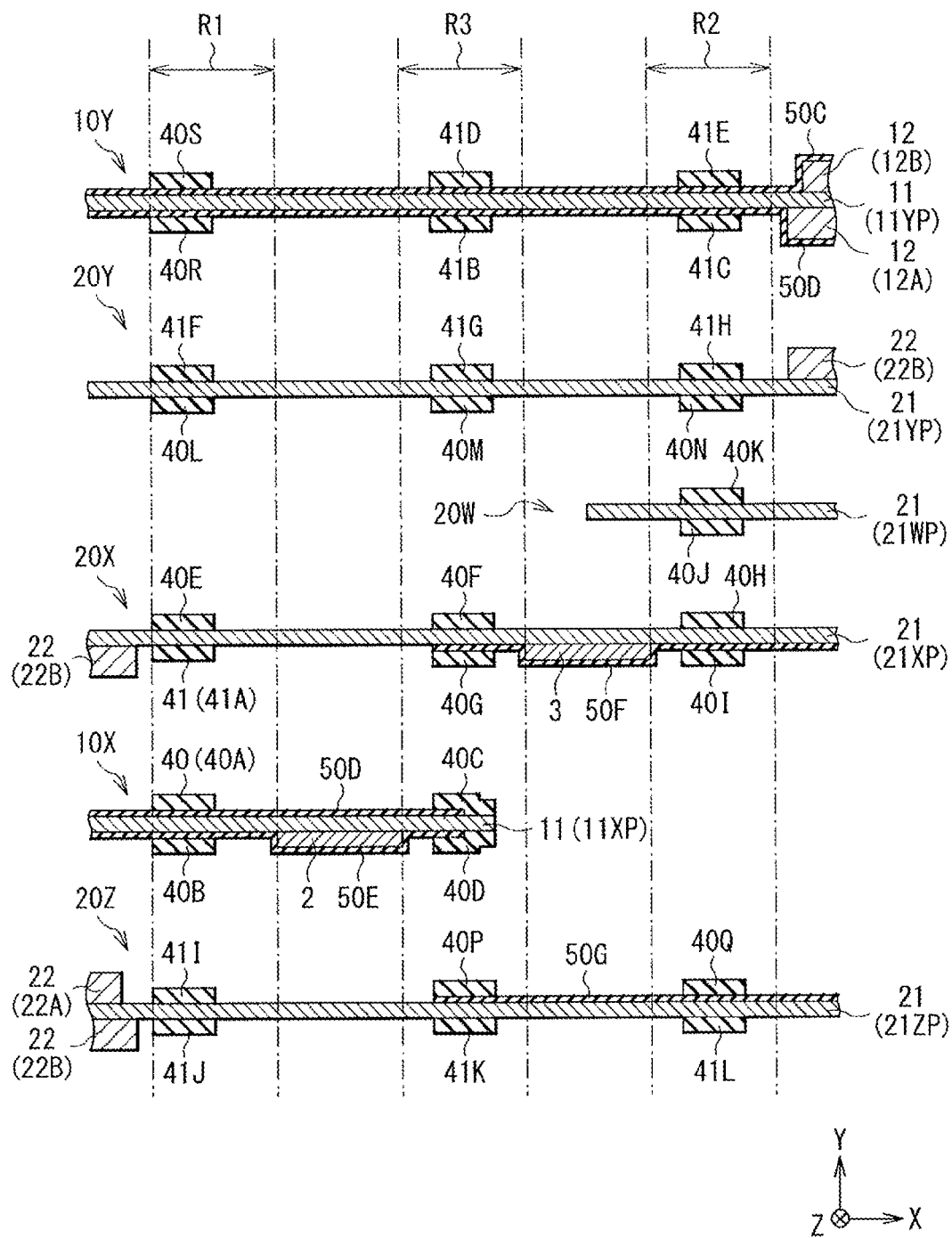
FIG. 6 is a sectional view illustrating a modification of the configuration of the main portion of each of the cathode and the anode illustrated in FIG. 5.

As illustrated in FIG. 6 corresponding to FIG. 5, a step reducing tape 41 (41A to 41L) may be additionally attached to one or both of the first cathode wound portion 10X and the first anode wound portion 20X, for example. That is, the step reducing tape 41 may be additionally attached to a position with no step reducing tape 40 attached in FIG. 5. The step reducing tape 41 has a configuration similar to that of the step reducing tape 40, for example. All of the step reducing tapes 41A to 41L do not need to be attached, and thus at least one of the step reducing tapes 41A to 41L needs to be attached. Even this case enables a similar effect to be obtained.

Specifically, the outer-peripheral-side anode active material layer 22B is provided on the outer peripheral surface of the anode current collector 21 in the first region R1 in the first anode wound portion 20X as illustrated in FIG. 5, for example, so that the step reducing tape 40 is not attached to the outer peripheral surface of the anode collector 21.

As illustrated in FIG. 6, when the outer-peripheral-side anode active material layer 22B is not provided on the outer peripheral surface of the anode current collector 21 in the first region R1, for example, the step reducing tape 41A may be attached to the outer peripheral surface of the anode current collector 21 (first anode exposed portion 21XP).

The fact that the additional step reducing tape 41 may be attached as described above also can apply to the second cathode wound portion 10Y, the second anode wound portion 20Y, and the third anode wound portion 20Z.

For example, the inner-peripheral-side cathode active material layer 12A is provided on the inner peripheral surface of the cathode current collector 11 in each of the second region R2 and the third region R3 in the second cathode wound portion 10Y as illustrated in FIG. 5, so that the step reducing tape 40 is not attached to the inner peripheral side surface of the cathode current collector 11.

When the inner-peripheral-side cathode active material layer 12A is not provided on the inner peripheral surface of the cathode current collector 11 in the second region R2 as illustrated in FIG. 6, for example, the step reducing tape 41C may be attached to the inner peripheral surface of the cathode current collector 11 (second cathode exposed portion 11YP). In addition, when the inner-peripheral-side cathode active material layer 12A is not provided on the inner peripheral surface of the cathode current collector 11 in the third region R3, for example, the step reducing tape 41B may be attached to the inner peripheral surface of the cathode current collector 11.

For example, the outer-peripheral-side cathode active material layer 12B is provided on the outer peripheral surface of the cathode current collector 11 in each of the second region R2 and the third region R3 in the second cathode wound portion 10Y as illustrated in FIG. 5, so that the step reducing tape 40 is not attached to the outer peripheral surface of the cathode current collector 11.

When the outer-peripheral-side cathode active material layer 12B is not provided on the outer peripheral surface of the cathode current collector 11 in the second region R2 as illustrated in FIG. 6, for example, the step reducing tape 41E may be attached to the outer peripheral surface of the cathode current collector 11 (second cathode exposed portion 11YP). In addition, when the outer-peripheral-side cathode active material layer 12B is not provided on the outer peripheral surface of the cathode current collector 11 in the third region R3, for example, the step reducing tape 41D may be attached to the outer peripheral surface of the cathode current collector 11.

For example, the outer-peripheral-side anode active material layer 22B is provided on the outer peripheral surface of the anode current collector 21 in each of the first region R1, the second region R2, and the third region R3, in the second anode wound portion 20Y as illustrated in FIG. 5, so that the step reducing tape 40 is not attached to the outer peripheral surface of the anode current collector 21.

As illustrated in FIG. 6, when the outer-peripheral-side anode active material layer 22B is not provided on the outer peripheral surface of the anode current collector 21 in the first region R1, for example, the step reducing tape 41F may be attached to the outer peripheral surface of the anode current collector 21 (second anode exposed portion 21YP). In addition, when the outer-peripheral-side anode active material layer 22B is not provided on the outer peripheral surface of the anode current collector 21 in the second region R2, for example, the step reducing tape 41H may be attached to the outer peripheral surface of the anode current collector 21. Further, when the outer-peripheral-side anode active material layer 22B is not provided on the outer peripheral surface of the anode current collector 21 in the third region R3, for example, the step reducing tape 41G may be attached to the outer peripheral surface of the anode current collector 21.

As illustrated in FIG. 5, the inner-peripheral-side anode active material layer 22A is provided on the inner peripheral surface of the anode current collector 21 in the first region R1 in the third anode wound portion 20Z, for example, so that the step reducing tape 40 is not attached to the inner peripheral surface of the anode current collector 21.

As illustrated in FIG. 6, when the inner-peripheral-side anode active material layer 22A is not provided on the inner peripheral surface of the anode current collector 21 in the first region R1, for example, the step reducing tape 41I may be attached to the inner peripheral surface of the anode current collector 21 (third anode exposed portion 21ZP).

For example, the outer-peripheral-side anode active material layer 22B is provided on the outer peripheral surface of the anode current collector 21 in each of the first region R1, the second region R2, and the third region R3, in the third anode wound portion 20Z as illustrated in FIG. 5, so that the step reducing tape 40 is not attached to the outer peripheral surface of the anode current collector 21.

As illustrated in FIG. 6, when the outer-peripheral-side anode active material layer 22B is not provided on the outer peripheral surface of the anode current collector 21 in the first region R1, for example, the step reducing tape 41J may be attached to the outer peripheral surface of the anode current collector 21 (third anode exposed portion 21ZP). In addition, when the outer-peripheral-side anode active material layer 22B is not provided on the outer peripheral surface of the anode current collector 21 in the second region R2, for example, the step reducing tape 41L may be attached to the outer peripheral surface of the anode current collector 21. Further, when the outer-peripheral-side anode active material layer 22B is not provided on the outer peripheral surface of the anode current collector 21 in the third region R3, for example, the step reducing tape 41K may be attached to the outer peripheral surface of the anode current collector 21.

Figure 7:
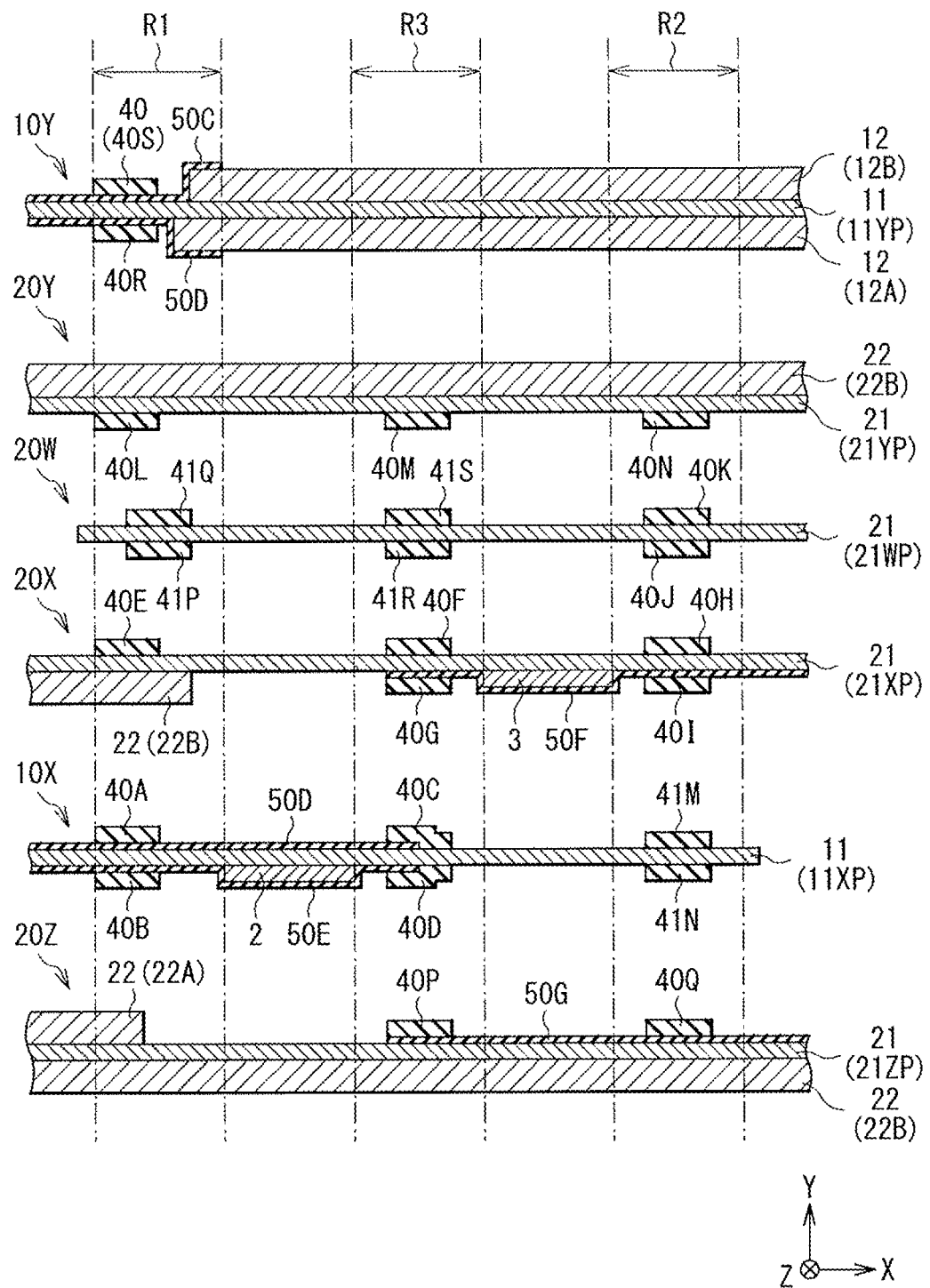
FIG. 7 is a sectional view illustrating another modification of the configuration of the main portion of each of the cathode and the anode illustrated in FIG. 5.

As illustrated in FIG. 7 corresponding to FIG. 5, an extension range of the first cathode wound portion 10X and an extension range of the fourth anode wound portion 20W may be changed so that the step reducing tapes 41 (41M, 41N, 41P to 41S) are attached, for example. All of the step reducing tapes 41M, 41N, and 41P to 41S do not need to be attached, and thus one or more of the step reducing tapes 41M, 41N, and 41P to 41S need to be attached. Even this case enables a similar effect to be obtained.

Specifically, the first cathode wound portion 10X may be extended to the second region R2 so that the step reducing tape 41M may be attached to the inner peripheral surface of the cathode current collector 11 (the first cathode exposed portion 11XP) in the second region R2, or the step reducing tape 41N may be attached to the outer peripheral surface of the cathode current collector 11 in the second region R2, for example.

In addition, the fourth anode wound portion 20W may be extended to the first region R1 via the third region R3 so that the step reducing tape 41P may be attached to the inner peripheral surface of the anode current collector 21 (fourth anode exposed portion 21WP) in the first region R1, or the step reducing tape 41Q may be attached to the outer peripheral surface of the anode current collector 21 in the first region R1, for example. The step reducing tape 41R may be attached to the inner peripheral surface of the anode current collector 21 (fourth anode exposed portion 21WP) in the third region R3, or the step reducing tape 41S may be attached to the outer peripheral surface of the anode current collector 21 in the third region R3.

As a matter of course, the fourth anode wound portion 20W may be extended to the third region R3 without being extended to the first region R1 to change the extension range of the fourth anode wound portion 20W so that only the step reducing tapes 41R and 41S are attached.

The number of the step reducing tapes 40 to be attached may be increased at each attachment position of the step reducing tape 40 described above.

As illustrated in FIG. 5, one step reducing tape 40A is attached to the inner peripheral surface of the first cathode exposed portion 11XP in the first region R1 in the first cathode wound portion 10X, for example. For example, two or more step reducing tapes 40A may be attached to the inner peripheral surface of the first cathode exposed portion 11XP. In this case, two or more step reducing tapes 40A may be attached in parallel, for example. Even this case enables a similar effect to be obtained.

According to an embodiment, two or more step reducing tapes 40 may also be attached to other attachment positions of the first cathode wound portion 10X in a similar manner. In addition, two or more step reducing tapes 40 may be attached to respective attachment positions of the second cathode wound portion 10Y, the first anode wound portion 20X, the second anode wound portion 20Y, the third anode wound portion 20Z, and the fourth anode wound portion 20W.

As illustrated in FIG. 5, a protective tape 50 is used, and a step reducing tape 40 is attached to the protective tape 50.

The step reducing tape 40 may be additionally attached without using the protective tape 50 or by changing an attachment range of the protective tape 50. Even this case enables a similar effect to be obtained.

Specifically, first, the step reducing tape 40A may be attached to the inner peripheral surface of the first cathode exposed portion 11XP in the first region R1 without using the protective tape 50D or by changing an attachment range of the protective tape 50D, for example. In addition, the step reducing tape 40B may be attached to the outer peripheral surface of the first cathode exposed portion 11XP in the first region R1 without using the protective tape 50E or by changing an attachment range of the protective tape 50E, for example.

Second, the step reducing tape 40R may be attached to the inner peripheral surface of the second cathode exposed portion 11YP in the first region R1 without using the protective tape 50D or by changing an attachment range of the protective tape 50D, for example. In addition, the step reducing tape 40S may be attached to the outer peripheral surface of the second cathode exposed portion 11YP in the first region R1 without using the protective tape 50C or by changing an attachment range of the protective tape 50C, for example.

Third, the step reducing tape 40G may be attached to the outer peripheral surface of the first anode exposed portion 21XP in the third region R3 without using the protective tape 50F or by changing an attachment range of the protective tape 50F, for example. In addition, the step reducing tape 40I may be attached to the outer peripheral surface of the first anode exposed portion 11XP in the second region R2 without using the protective tape 50F or by changing an attachment range of the protective tape 50F, for example.

Fourth, the step reducing tape 40P may be attached to the inner periphery peripheral surface of the third anode exposed portion 21ZP in the third region R3 without using the protective tape 50G or by changing an attachment range of the protective tape 50G, for example. In addition, the step reducing tape 40Q may be attached to the inner periphery peripheral surface of the third anode exposed portion 21ZP in the second region R2 without using the protective tape 50G or by changing an attachment range of the protective tape 50G, for example.

As illustrated in FIG. 5, the step reducing tape 40 is attached to each of six portions (the first cathode wound portion 10X, the second cathode wound portion 10Y, the first anode wound portion 20X, the second anode wound portion 20Y, the third anode wound portion 20Z, and the fourth anode wound portion 20W), which are disposed at respective places near the winding axis J, in the cathode 10 and the anode 20.

The step reducing tape 40 may be attached to a portion in the cathode 10, outside the first cathode wound portion 10X and the second cathode wound portion 10Y. In addition, the step reducing tape 40 may be attached to a portion in the anode 20, outside the first anode wound portion 20X, the second anode wound portion 20Y, the third anode wound portion 20Z, and the fourth anode wound portion 20W.

Then, when the step reducing tapes 40 are attached to portions of the cathode 10, which are near the winding axis J, the influence of the step, on the wound state of the cathode 10, is easily reduced. Thus, it is preferable to attach the step reducing tapes 40 to the respective portions (the first cathode wound portion 10X and the second cathode wound portion 10Y) of the cathode 10, which are near the winding axis J.

In addition, when the step reducing tapes 40 are attached to portions of the anode 20, which are near the winding axis J, the influence of the step, on the wound state of the anode 20, is easily reduced. Thus, it is preferable to attach the step reducing tapes 40 to the respective portions (the first anode wound portion 20X, the second anode wound portion 20Y, the third anode wound portion 20Z, and the fourth anode wound portion 20W) of the anode 20, which are near the winding axis J.

Next, an application example (application) of the above-described secondary battery will be described.

The application of the secondary battery is not particularly limited, as long as it is used in machines, apparatuses, appliances, devices, and systems (assembly of a plurality of apparatuses and the like) that can use the secondary battery as a power source for driving, and a power storage source for storing electric power. The secondary battery used as a power source may be used as a main power source or an auxiliary power source. The main power source is used preferentially regardless of the presence or absence of other power sources. The auxiliary power source may be used instead of the main power source or may be switched from the main power source as necessary, for example. When the secondary battery is used as an auxiliary power source, the type of the main power source is not limited to the secondary battery.

Applications of the secondary battery are, for example, as follows: electronic apparatuses (including portable electronic apparatuses) such as video cameras, digital still cameras, mobile phones, notebook computers, cordless phones, headphone stereos, portable radios, portable televisions, and portable information terminals; portable life instruments such as electric shavers; storage devices such as backup power sources and memory cards; electric tools such as electric drills and electric saws; battery packs each mounted on a notebook computer or the like as a detachable power source; medical electronic apparatuses such as pacemakers and hearing aids; electric vehicles such as electric automobiles (including hybrid cars); and electric power storage system such as domestic battery systems that store electric power in preparation for emergency or the like. the application of the secondary battery may be other than the above according to an embodiment of the present technology.

In particular, it is effective that the secondary battery is used in a battery pack, an electric vehicle, an electric power storage system, an electric tool, an electronic apparatus, and the like. This is because these applications each require excellent battery characteristics, and use of the secondary battery of the present technology enables effective improvement in performance. The battery pack is a power source including the secondary battery. The battery pack may include a single cell or an assembled battery, as described later. The electric vehicle operates (travels) using the secondary battery as a driving power source, and may be a car (a hybrid car or the like) that also includes a driving source other than the secondary battery, as described above. The electric power storage system uses the secondary battery as an electric power storage source. For example, electric power is stored in the secondary battery serving as an electric power storage source, in a domestic electric power storage system, so that domestic electric appliances or the like can be used by using the electric power. The electric tool is a tool in which a movable part (e.g., a drill or the like) moves using the secondary battery as a power source for driving. The electronic apparatus achieves various functions using the secondary battery as a power source (electric power supply source) for driving.

Here, some application examples of the secondary battery will be specifically described. A configuration of the application examples described below is merely an example, so that the configuration of the application examples can be appropriately changed.

Figure 8:
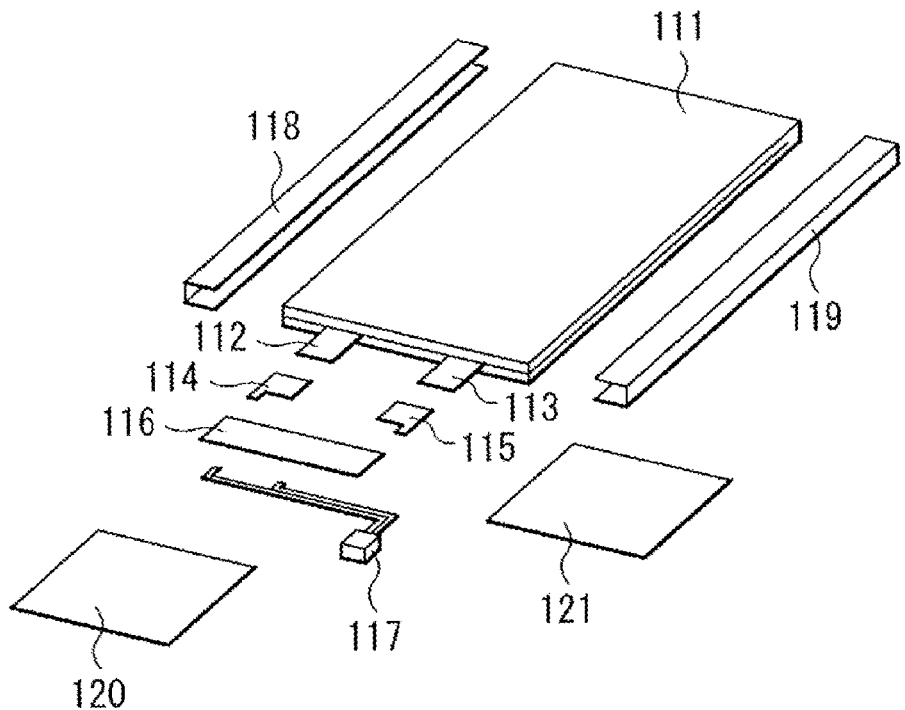
FIG. 8 is a perspective view illustrating a configuration of an application example (battery pack: single cell) of the secondary battery according to an embodiment of the present technology.
Figure 9:
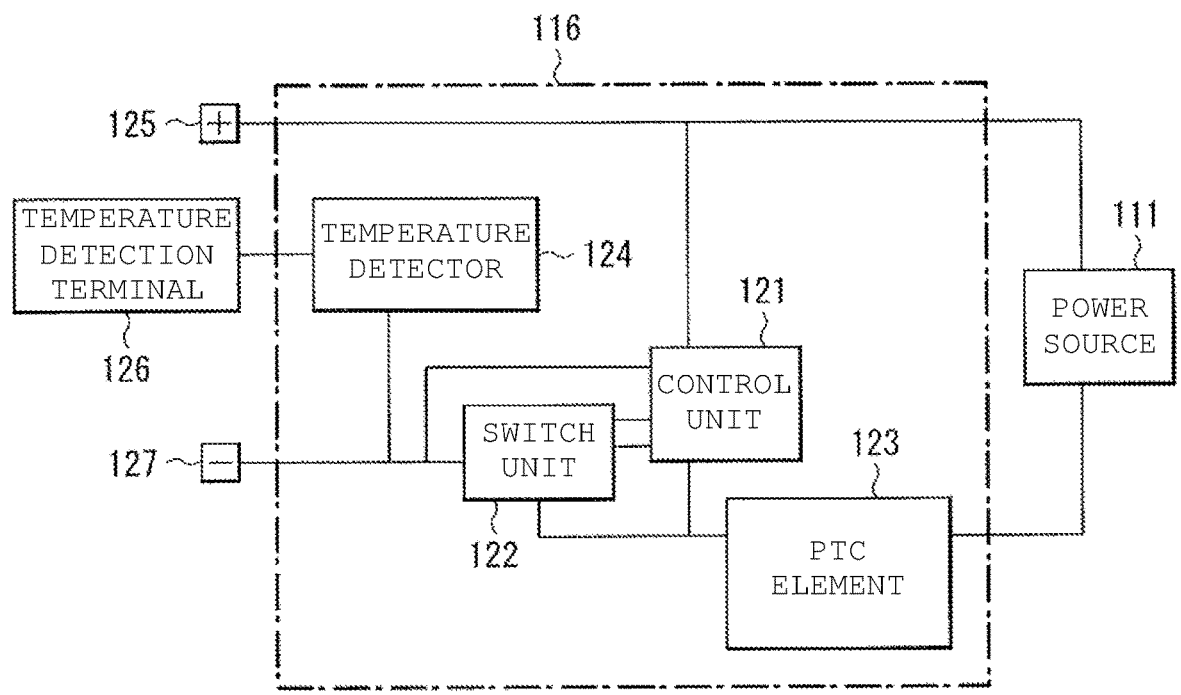
FIG. 9 is a block diagram illustrating a configuration of the battery pack illustrated in FIG. 8.

FIG. 8 illustrates a perspective configuration of a battery pack including a single cell according to an embodiment, and FIG. 9 illustrates a block configuration of the battery pack illustrated in FIG. 8. FIG. 8 illustrates the battery pack that is disassembled.

The battery pack described here is a simplified battery pack (so-called soft pack) including one secondary battery, and is mounted on electronic apparatuses typified by smart phones, for example. As illustrated in FIG. 8, the battery pack includes a power source 111 that is a secondary battery of laminate film type and a circuit board 116 connected to the power source 111, for example. The power source 111 is provided with a cathode lead 112 and an anode lead 113.

A pair of adhesive tapes 118 and 119 is attached to both side faces of the power source 111. The circuit board 116 is provided with a protection circuit (PCM: protection circuit module). The circuit board 116 is connected to the cathode 112 with a tab 114, and is also connected to the anode lead 113 with a tab 115. The circuit board 116 is also connected to a connector-equipped lead wire 117 for external connection. When the circuit board 116 is connected to the power source 111, the circuit board 116 is protected by a label 120 and an insulating sheet 121. The label 120 is attached to fix the circuit board 116, the insulating sheet 121, and the like.

As illustrated in FIG. 9, the battery pack includes the power source 111 and the circuit board 116, for example. The circuit board 116 includes a control unit (controller) 121 including a processor, a switch unit (switch) 122, a heat-sensitive resistance element (PTC element) 123, and a temperature detector 124, for example. The power source 111 can be connected to the outside via a cathode terminal 125 and an anode terminal 127, so that the power source 111 can be charged and discharged via the cathode terminal 125 and the anode terminal 127. The temperature detector 124 detects temperature using a temperature detection terminal (so-called T terminal) 126.

The control unit 121 controls operation of the entire battery pack (including a use state of the power source 111). The control unit 121 includes a central processing unit (CPU), a memory, and the like, for example.

The control unit 121 disconnects the switch unit 122 to prevent charging current from flowing through a current path of the power source 111 when the battery voltage reaches an overcharge detection voltage, for example. The control unit 121 also disconnects the switch unit 122 to interrupt charging current when a large current flows during charging, for example.

Meanwhile, the control unit 121 disconnects the switch unit 122 to prevent discharging current from flowing through the current path of the power source 111 when the battery voltage reaches an overdischarge detection voltage, for example. The control unit 121 also disconnects the switch unit 122 to interrupt discharging current when a large current flows during discharging, for example.

The overcharge detection voltage is not particularly limited, and is 4.2 V±0.05 V, for example. The overdischarge detection voltage is not particularly limited, and is 2.4 V±0.1 V, for example.

The switch unit 122 switches the use state of the power source 111, that is, connection and disconnection between the power source 111 and an external device, according to an instruction from the control unit 121. The switch unit 122 includes a charge control switch and a discharge control switch, for example. Each of the charge control switch and the discharge control switch is a semiconductor switch such as a field effect transistor (MOSFET) using a metal oxide semiconductor, for example. The charging-discharging current is detected based on ON resistance of the switch unit 122, for example.

The temperature detector 124 measures temperature of the power source 111, and outputs a measurement result of the temperature to the control unit 121. The temperature detector 124 includes a temperature detection element such as a thermistor, for example. The measurement result of the temperature measured by the temperature detector 124 is used when the control unit 121 controls charging and discharging at the time of abnormal heat generation and when the control unit 121 performs correction processing at the time of calculating remaining capacity, for example.

The circuit board 116 does not need to have the PTC element 123. In this case, the circuit board 116 may be provided with a different PTC element.

Figure 10:
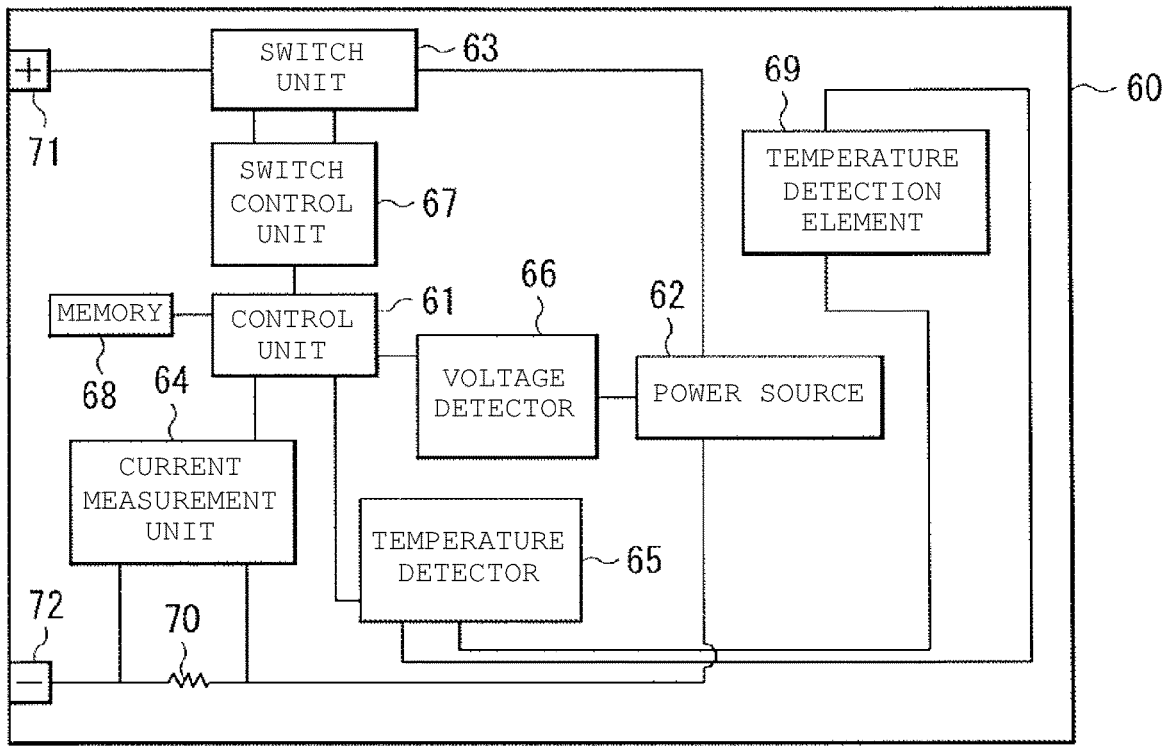
FIG. 10 is a block diagram illustrating a configuration of an application example (battery pack: assembled battery) of the secondary battery according to an embodiment of the present technology.

FIG. 10 illustrates a block configuration of a battery pack including an assembled battery.

The battery pack includes a housing 60 provided in its inside a control unit (controller) 61 including a processor, a power source 62, a switch unit (switch) 63, a current measurement unit 64, a temperature detector 65, a voltage detector 66, a switch control unit 67, a memory 68, a temperature detection element 69, a current detection resistor 70, a cathode terminal 71, and an anode terminal 72, for example. The housing 60 is made of a plastic material or the like, for example.

The control unit 61 controls operation of the entire battery pack (including a use state of the power supply 62). The control unit 61 includes a CPU and the like, for example. The power source 62 is an assembled battery including two or more secondary batteries. The two or more secondary batteries may be connected in series, in parallel, or in a mixed manner of series and parallel. For example, the power source 62 includes six secondary batteries that are connected such that three secondary batteries connected in series are connected in parallel in two rows.

The switch unit 63 switches the use state of the power source 62, that is, connection and disconnection between the power source 62 and an external device, according to an instruction from the control unit 61. The switch unit 63 includes a charge control switch, a discharge control switch, a charging diode, a discharging diode, and the like, for example. Each of the charge control switch and the discharge control switch is a semiconductor switch such as a field effect transistor (MOSFET) using a metal oxide semiconductor, for example.

The current measurement unit 64 measures current using the current detection resistor 70, and outputs the measurement result of the current to the control unit 61. The temperature detector 65 measures temperature using the temperature detection element 69, and outputs the measurement result of the temperature to the control unit 61. The measurement result of the temperature is used when the control unit 61 controls charging and discharging at the time of abnormal heat generation and when the control unit 61 performs correction processing at the time of calculating remaining capacity, for example. The voltage detector 66 measures voltage of the secondary battery in the power source 62, and supplies a measurement result of analog-digital converted voltage to the control unit 61.

The switch control unit 67 controls operation of the switch unit 63 according to a signal received from each of the current measurement unit 64 and the voltage detector 66.

The switch control unit 67 disconnects the switch unit 63 (charging control switch) to prevent charging current from flowing through a current path of the power source 62 when the battery voltage reaches an overcharge detection voltage, for example. This enables only discharging via the discharging diode in the power source 62. The switch control unit 67 interrupts charging current when a large current flows during charging, for example.

The switch control unit 67 disconnects the switch unit 63 (discharge control switch) to prevent discharging current from flowing through the current path of the power source 62 when the battery voltage reaches an overdischarge detection voltage, for example. This enables only charging via the charging diode in the power source 62. The switch control unit 67 interrupts discharging current when a large current flows during discharging, for example.

The overcharge detection voltage is not particularly limited, and is 4.2 V±0.05 V, for example. The overdischarge detection voltage is not particularly limited, and is 2.4 V±0.1 V, for example.

The memory 68 includes an EEPROM serving as a nonvolatile memory, and the like, for example. The memory 68 stores numerical values calculated by the control unit 61, and information (e.g., internal resistance in an initial state) on the secondary battery measured in a manufacturing process stage, for example. When full charge capacity of the secondary battery is stored in the memory 68, the control unit 61 can grasp information such as remaining capacity.

The temperature detection element 69 measures temperature of the power source 62, and outputs a measurement result of the temperature to the control unit 61. The temperature detection element 69 includes a thermistor and the like, for example.

Each of the cathode terminal 71 and the anode terminal 72 is to be connected to an external device (e.g., a notebook computer or the like) that operates using a battery pack, an external device (e.g., a charger or the like) used for charging a battery pack, or the like. The power source 62 can be charged and discharged via the cathode terminal 71 and the anode terminal 72.

Figure 11:
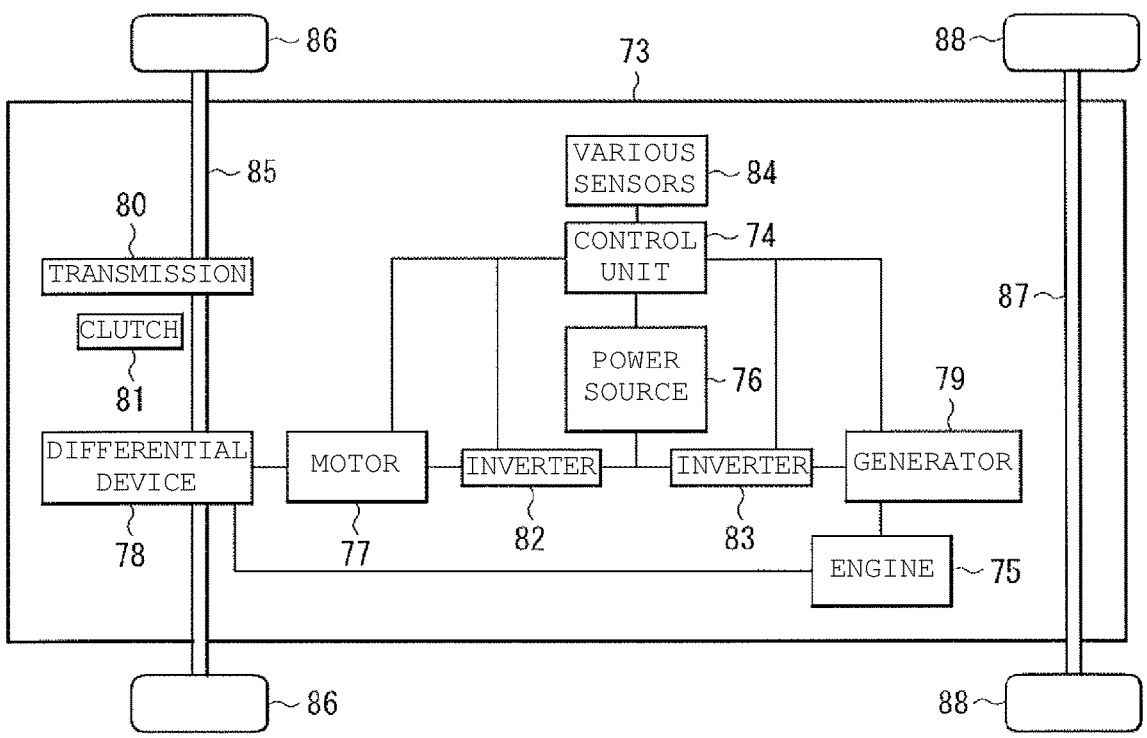
FIG. 11 is a block diagram illustrating a configuration of an application example (electric vehicle) of the secondary battery according to an embodiment of the present technology.

FIG. 11 illustrates a block configuration of a hybrid car serving as an example of an electric vehicle according to an embodiment.

The electric vehicle includes a metal body 73 provided in its inside with a control unit (controller) 74 including a processor, an engine 75, a power source 76, a drive motor 77, a differential device 78, a generator 79, a transmission 80, a clutch 81, inverters 82 and 83, and various sensors 84, for example. Besides this, the electric vehicle includes a front wheel drive shaft 85 and a front wheel 86, which are connected to the differential device 78 and the transmission 80, and a rear wheel drive shaft 87 and a rear wheel 88, for example.

The electric vehicle can travel using one or both of the engine 75 and the motor 77 as a drive source, for example. The engine 75 is a main power supply such as a gasoline engine, for example. When the engine 75 is used as a power supply, for example, a driving force (rotational force) of the engine 75 is transmitted to the front wheel 86 and the rear wheel 88 using the differential device 78, the transmission 80, and the clutch 81 that are driving units (drivers). The rotational force of the engine 75 is transmitted to the generator 79, so that the generator 79 uses the rotational force to generate AC power. The AC power is converted into DC power using the inverter 83, and the DC power is stored in the power source 76. Meanwhile, when the motor 77 serving as a converting unit (converter) is used as a power supply, power (DC power) supplied from the power source 76 is converted into AC power using the inverter 82. Then, the motor 77 is driven by using the AC power. The driving force (rotational force) converted from the electric power by the motor 77 is transmitted to the front wheel 86 and the rear wheel 88 using the differential device 78, the transmission 80, and the clutch 81 that are driving units, for example.

When the electric vehicle decelerates using a braking mechanism, a resistance force at the time of deceleration is transmitted to the motor 77 as a rotational force. Thus, the motor 77 may be configured to generate AC power by using the rotational force. The AC power is converted into DC power using the inverter 82, so that it is preferable that the DC regenerative power can be stored in the power source 76.

The control unit 74 controls operation of the entire electric vehicle. The control unit 74 includes a CPU and the like, for example. The power source 76 includes one or more secondary batteries. The power source 76 is connected to an external power source, and may receive electric power supplied from the external power source to store the electric power. The various sensors 84 are used to control rotation speed of the engine 75 and to control opening (throttle opening) of a throttle valve, for example. The various sensors 84 include any one or more kinds of speed sensor, acceleration sensor, engine rotational sensor, and the like, for example.

While a hybrid car is described as an example of electric vehicles, the electric vehicles each may be a vehicle (electric automobile) that operates using only the power source 76 and the motor 77 without using the engine 75.

Figure 12:
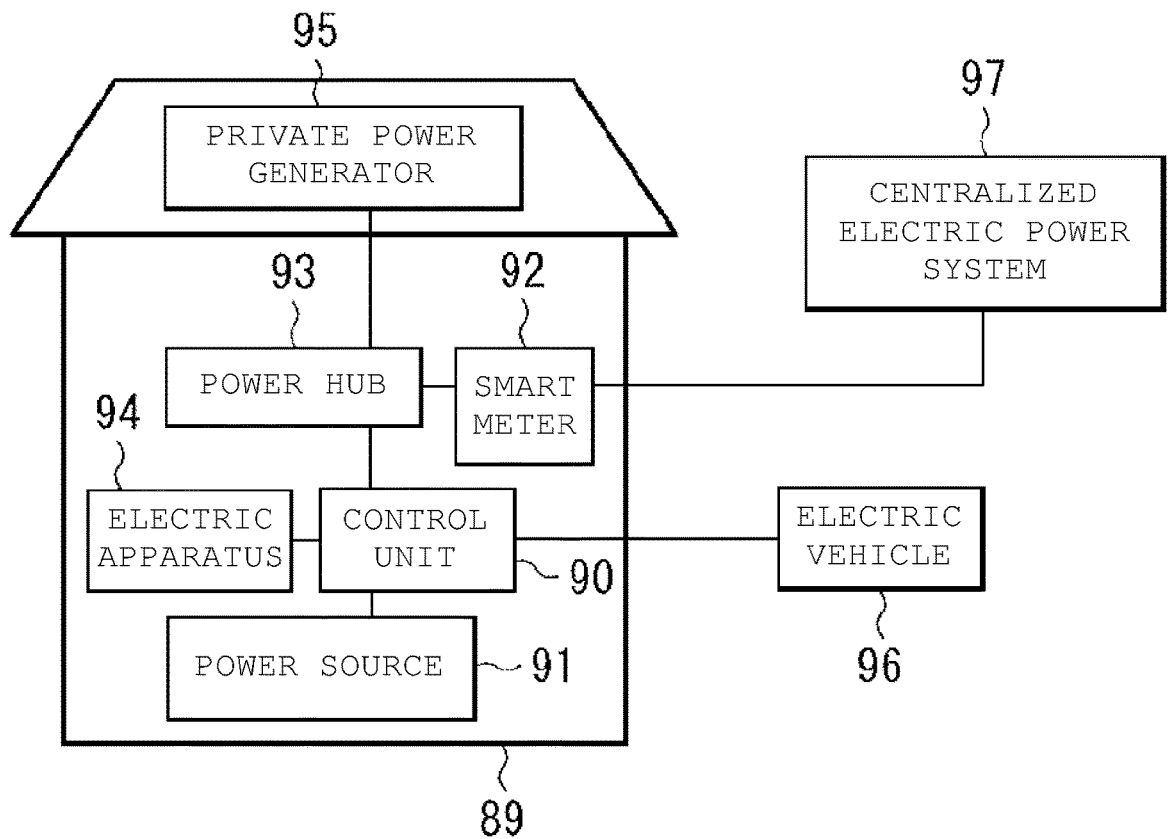
FIG. 12 is a block diagram illustrating a configuration of an application example (electric power storage system) of the secondary battery according to an embodiment of the present technology.

FIG. 12 illustrates a block configuration of an electric power storage system according to an embodiment.

The power storage system includes a control unit (controller) 90 including a processor, a power source 91, a smart meter 92, and a power hub 93, inside a house 89 such as a general residential building and a commercial building, for example.

Here, the power source 91 is connected to an electric apparatus 94 installed inside the house 89, and is connectable to an electric vehicle 96 stopped outside the house 89, for example. The power source 91 is also connected to a private power generator 95 installed in the house 89 using the power hub 93, for example, and is connectable to an external centralized electric power system 97 via the smart meter 92 and the power hub 93.

The electric apparatus 94 includes one or more home electric appliances, such as a refrigerator, an air conditioner, a television, a water heater, and the like. The private power generator 95 includes any one or more kinds of solar power generator and wind power generator, for example. The electric vehicle 96 includes any one or more kinds of electric automobile, electric bike, hybrid car, and the like, for example. The centralized electric power system 97 includes any one or more kinds of thermal power plant, nuclear power plant, hydraulic power plant, wind power plant, and the like, for example.

The control unit 90 controls operation of the entire electric power storage system (including a use state of the power source 91). The control unit 90 includes a CPU and the like, for example. The power source 91 includes one or more secondary batteries. The smart meter 92 is a network-compliant power meter installed in the house 89 on a power demand side, and is capable of communicating with a power supply side, for example.

Accordingly, the smart meter 92 controls balance between supply and demand of electric power in the house 89 while communicating with the outside, for example, thereby enabling high-efficiency and stable supply of energy.

In the electric power storage system, electric power supplied from the centralized electric power system 97, serving as an external power source, via the smart meter 92 and the power hub 93 is stored in the power source 91, and electric power supplied from the private power generator 95, serving as an independent power source, via the power hub 93 is stored in the power supply 91, for example. The electric power stored in the power source 91 is supplied to the electric apparatus 94 and the electric vehicle 96 according to an instruction of the control unit 90, so that the electric apparatus 94 can be operated and the electric vehicle 96 can be charged. That is, the electric power storage system enables electric power to be stored and supplied in the house 89 using the power source 91.

The electric power stored in the power source 91 can be used as required. For this reason, electric power supplied from the centralized electric power system 97 is stored in the power source 91 in the middle of the night when electricity charge is low to enable the electric power stored in the power source 91 to be used during the day when the electricity charge is high, for example.

The electric power storage system as described herein may be installed for each house (one household), or may be installed for each of a plurality of houses (a plurality of households).

Figure 13:
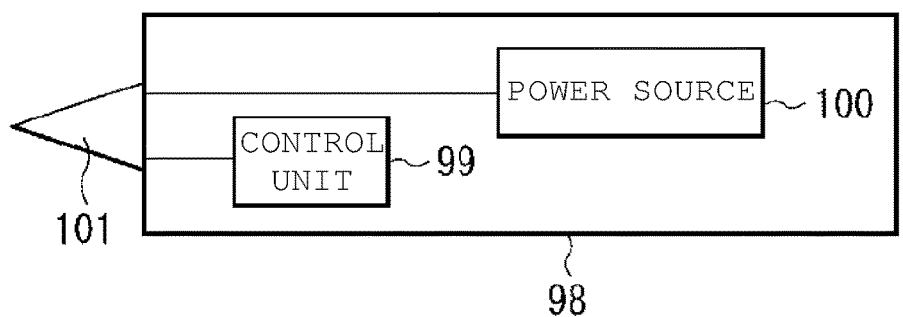
FIG. 13 is a block diagram illustrating a configuration of an application example (electric tool) of the secondary battery according to an embodiment of the present technology.

FIG. 13 illustrates a block configuration of an electric tool according to an embodiment.

The electric tool described here is an electric drill, for example. The electric tool includes a tool body 98 provided in its inside with a control unit 99 and a power source 100, for example. A drill part 101 serving as a movable part is attached to the tool body 98 in an operable (rotatable) manner, for example.

The tool body 98 includes a plastic material or the like, for example. The control unit 99 controls operation of the entire electric tool (including a use state of a power source 100). The control unit 99 includes a CPU and the like, for example. The power supply 100 includes one or more secondary batteries. The control unit 99 causes the power supply 100 to supply electric power from to the drill part 101 according to operation of an operation switch.

Examples of the present technology will be described.

Experimental Examples 1 to 59

A secondary battery (lithium ion secondary battery) of a laminate film type, illustrated in FIGS. 1 to 5, was prepared by the following procedure, and battery characteristics of the secondary battery were evaluated.

To prepare a cathode 10, first, 91 parts by mass of a cathode active material (lithium cobalt oxide), 3 parts by mass of a cathode binder (polyvinylidene fluoride), and 6 parts by mass of a cathode conductive agent (graphite) were mixed to obtain a cathode mixture. Subsequently, the cathode mixture was poured into an organic solvent (N-methyl-2-pyrrolidone), and then the organic solvent was stirred to obtain a paste-like cathode mixture slurry. Subsequently, the cathode mixture slurry was applied to both sides of a cathode current collector 11 (aluminum foil having a thickness of 12 μm and a height of 90 mm) in a belt shape by using a coating device, and then the cathode mixture slurry was dried to form a cathode active material layer 12 (an inner-peripheral-side cathode active material layer 12A and an outer-peripheral-side cathode active material layer 12B). Finally, the cathode active material layer 12 was compression molded by using a roll press machine.

To prepare an anode 20, first, 97 parts by mass of an anode active material (artificial graphite) and 3 parts by mass of an anode binder (polyvinylidene fluoride) were mixed to obtain an anode mixture. Subsequently, the anode mixture was poured into an organic solvent (N-methyl-2-pyrrolidone), and then the organic solvent was stirred to obtain a paste-like anode mixture slurry. Subsequently, the anode mixture slurry is applied to both sides of an anode current collector 21 (copper foil having a thickness of 10 μm and a height of 91.2 mm) in a belt shape by using the coating device, and then the anode mixture slurry was dried to form an anode active material layer 22 (an inner-peripheral-side anode active material layer 22A and an outer-peripheral-side anode active material layer 22B). Finally, the anode active material layer 22 was compression molded by using the roll press machine.

To prepare an electrolytic solution, an electrolyte salt (lithium hexafluoride) was added to a solvent (ethylene carbonate, propylene carbonate, diethyl carbonate, and vinylene carbonate), and then the solvent was stirred. The solvent had a mixing ratio (weight ratio) as follows: ethylene carbonate:propylene carbonate:diethyl carbonate:vinylene carbonate=20:20:59:1. The electrolytic solution had an electrolyte salt content of 1 mol/kg.

To assemble a secondary battery, first, a cathode lead 2 made of aluminum (having a width of 10 mm and a thickness of 80 μm) was welded to the cathode 10 (cathode current collector 11), and an anode lead 3 made of nickel (having a width of 10 mm and a thickness of 80 μm) was welded to the anode 20 (anode current collector 21). In this case, a distance between the cathode lead 2 and the anode lead 3 was set to 12 mm.

Subsequently, step reducing tapes 40 (adhesive tape made of polypropylene) and protective tapes 50 (50A to 50G: adhesive tape made of polypropylene) were attached to each of the cathode 10 and the anode 20. Position of the step reducing tapes 40 attached and the number and kind thereof are as shown in Tables 1 to 4. In this case, thickness (m), ratio T (%), width (mm), ratio W (%), height (mm), and ratio H (%) were set for each of the step reducing tapes 40, as shown in Tables 1 to 4. In Table 4 (Experimental Examples 54 to 58), the thickness (m), the ratio T (%), the width (mm), the ratio W (%), the height (mm), and the ratio H (%) are shown for each of the step reducing tapes 40.

For comparison, the step reducing tape 40 was not attached to each of the cathode 10 and the anode 20. The presence or absence of the step reducing tape 40 is as shown in Tables 1 to 4.

Subsequently, the cathode 10 and the anode 20 were laminated to each other with a separator 30 (microporous polyethylene film having a thickness of 15 μm) interposed therebetween to obtain a laminate. Then, after the laminate was wound in its longitudinal direction, a winding stop tape 58 was attached to a wound end portion of the laminate to obtain a wound body. Subsequently, an exterior member 1 was folded so as to sandwich the wound body, and then outer peripheral portions of three sides of the exterior member 1 were thermally fused under reduced pressure environment. As the exterior member 1, there was used an aluminum laminate film in which a nylon film (having a thickness of 25 μm), an aluminum foil (having a thickness of 40 μm), and a polypropylene film (having a thickness of 30 μm) were laminated in this order from the outside. In this case, an adhesive film 4 (polypropylene film having a thickness of 60 μm) was inserted between the exterior member 1 and the cathode lead 2, and an adhesive film 5 (polypropylene film having a thickness of 60 μm) was inserted between the exterior member 1 and the anode lead 3.

Subsequently, an electrolytic solution was injected into the exterior member 1 to cause the wound body to be impregnated with the electrolytic solution, and then the outer peripheral portion of the remaining one side of the exterior member 1 was thermally fused to itself under reduced pressure environment. As a result, a wound electrode body 100 was obtained, and was enclosed in the exterior member 1. Finally, the exterior member 1 with the wound electrode body 100 enclosed was compressed while being heated so as to mold the wound electrode body 100 in a flat shape.

As a result, a secondary battery of a laminate film type (having a width of 40 mm and a height of 100 mm) was completed.

To evaluate battery characteristics of the secondary battery, cycle characteristics of the secondary battery were examined, so that results as shown in Tables 1 to 4 were obtained. To examine the cycle characteristics, a capacity retention rate (%) was obtained by performing a cycle test.

Specifically, first, the secondary battery was charged and discharged (one cycle) under ambient temperature environment (in a temperature of 23° C.) in order to stabilize a state of the secondary battery. At the time of charging, the battery was charged at a constant current until voltage reached 4.2 V at a current of 1C after the battery was charged at a constant voltage until the current reached 0.05C at a voltage of 4.2 V. At the time of discharging, the battery was discharged at a constant current until the voltage reached 3.0

V at a current of 1C. The term, "1C" is a current value at which battery capacity (theoretical capacity) can be discharged in one hour, and the term, "0.05C" is a current value at which the battery capacity can be discharged in 20 hours.

Subsequently, the secondary battery was charged and discharged again in the same environment to measure the discharge capacity in the second cycle. The charging and discharging conditions were set similar to those for stabilizing a state of the secondary battery, except that the current during charging was changed to 0.7C and the current during discharging was changed to 0.7C. The term, "0.7C" is a current value at which battery capacity can be discharged in 10/7 hours.

In the same environment, the secondary battery was then repeatedly charged and discharged until a total number of cycles reached 500 cycles, and the discharge capacity at the 500th cycle was measured. The charging and discharging conditions were set similar to those for the second cycle.

Finally, the capacity retention rate was calculated as follows: capacity retention rate (%)=(discharge capacity at 500th cycle/discharge capacity at second cycle)×100.

TABLE 1

| Experimental Example | Presence or absence | Attachment position | Number of attachment | Kind | Thickness (μm) | Ratio T (%) | Width (mm) | Ratio W (%) | Height (mm) | Ratio H (%) | Capacity retention rate (%) |
|---|---|---|---|---|---|---|---|---|---|---|---|
| 1 | Presence | First anode wound portion | 1 | 40G | 9 | 11 | 7 | 58 | 92.5 | 101 | 78 |
| 2 | | | | | 12 | 15 | 7 | 58 | 92.5 | 101 | 82 |
| 3 | | | | | 30 | 38 | 7 | 58 | 92.5 | 101 | 83 |
| 4 | | | | | 64 | 80 | 7 | 58 | 92.5 | 101 | 82 |
| 5 | | | | | 73 | 91 | 7 | 58 | 92.5 | 101 | 76 |
| 6 | Presence | First cathode wound portion | 1 | 40D | 9 | 11 | 7 | 58 | 92.0 | 102 | 75 |
| 7 | | | | | 12 | 15 | 7 | 58 | 92.0 | 102 | 84 |
| 8 | | | | | 30 | 38 | 7 | 58 | 92.0 | 102 | 83 |
| 9 | | | | | 64 | 80 | 7 | 58 | 92.0 | 102 | 85 |
| 10 | | | | | 73 | 91 | 7 | 58 | 92.0 | 102 | 77 |
| 11 | Presence | First anode wound portion | 1 | 40G | 30 | 38 | 4 | 33 | 92.5 | 101 | 74 |
| 12 | | | | | 30 | 38 | 5 | 42 | 92.5 | 101 | 78 |
| 13 | | | | | 30 | 38 | 6 | 50 | 92.5 | 101 | 82 |
| 14 | | | | | 30 | 38 | 9 | 75 | 92.5 | 101 | 83 |
| 15 | | | | | 30 | 38 | 10 | 83 | 92.5 | 101 | 83 |
| 16 | | | | | 30 | 38 | 10.8 | 90 | 92.5 | 101 | 82 |
| 17 | | | | | 30 | 38 | 12 | 100 | 92.5 | 101 | 77 |

TABLE 2

| Experimental Example | Presence or absence | Attachment position | Number of attachment | Kind | Thickness (μm) | Ratio T (%) | Width (mm) | Ratio W (%) | Height (mm) | Ratio H (%) | Capacity retention rate (%) |
|---|---|---|---|---|---|---|---|---|---|---|---|
| 18 | Presence | First anode wound portion | 1 | 40G | 30 | 38 | 10 | 83 | 17.0 | 19 | 77 |
| 19 | | | | | 30 | 38 | 10 | 83 | 18.0 | 20 | 81 |
| 20 | | | | | 30 | 38 | 10 | 83 | 19.0 | 21 | 85 |
| 21 | | | | | 30 | 38 | 10 | 83 | 45.0 | 49 | 84 |
| 22 | | | | | 30 | 38 | 10 | 83 | 95.7 | 105 | 85 |
| 23 | | | | | 30 | 38 | 10 | 83 | 97.0 | 106 | 78 |
| 24 | Presence | First anode wound portion | 1 | 40E | 9 | 11 | 5 | — | 92.5 | 101 | 76 |
| 25 | | | | | 12 | 15 | 5 | — | 92.5 | 101 | 82 |
| 26 | | | | | 30 | 38 | 5 | — | 92.5 | 101 | 83 |
| 27 | | | | | 64 | 80 | 5 | — | 92.5 | 101 | 84 |
| 28 | | | | | 73 | 91 | 5 | — | 92.5 | 101 | 78 |
| 29 | Presence | First anode wound portion | 1 | 40E | 30 | 38 | 5 | — | 17.0 | 19 | 76 |
| 30 | | | | | 30 | 38 | 5 | — | 18.0 | 20 | 81 |
| 31 | | | | | 30 | 38 | 5 | — | 19.0 | 21 | 82 |
| 32 | | | | | 30 | 38 | 5 | — | 45.0 | 49 | 83 |
| 33 | | | | | 30 | 38 | 5 | — | 95.7 | 105 | 84 |
| 34 | | | | | 30 | 38 | 5 | — | 97.0 | 106 | 76 |

TABLE 3

| Experimental Example | Step reducing tape ||||||||||| Capacity retention rate (%) |
| --- | --- | --- | --- | --- | --- | --- | --- | --- | --- | --- | --- |
| | Presence or absence | Attachment position | Number of attachment | Kind | Thickness (μm) | Ratio T (%) | Width (mm) | Ratio W (%) | Height (mm) | Ratio H (%) | |
| 35 | Presence | First anode wound portion | 1 | 40I | 9 | 11 | 5 | — | 92.5 | 101 | 76 |
| 36 | | | | | 12 | 15 | 5 | — | 92.5 | 101 | 82 |
| 37 | | | | | 30 | 38 | 5 | — | 92.5 | 101 | 82 |
| 38 | | | | | 64 | 80 | 5 | — | 92.5 | 101 | 83 |
| 39 | | | | | 73 | 91 | 5 | — | 92.5 | 101 | 77 |
| 40 | Presence | First anode wound portion | 1 | 40F | 30 | 38 | 7 | 58 | 92.5 | 101 | 82 |
| 41 | | | 1 | 40H | 30 | 38 | 7 | — | 92.5 | 101 | 82 |
| 42 | Presence | First cathode wound portion | 1 | 40A | 30 | 38 | 7 | — | 92.0 | 102 | 82 |
| 43 | | | 1 | 40B | 30 | 38 | 7 | — | 92.0 | 102 | 82 |
| 44 | | | 1 | 40C | 30 | 38 | 7 | 58 | 92.0 | 102 | 82 |
| 45 | Presence | Second anode wound portion | 1 | 40L | 30 | 38 | 7 | — | 92.5 | 101 | 82 |
| 46 | | | 1 | 40M | 30 | 38 | 7 | 58 | 92.5 | 101 | 82 |
| 47 | | | 1 | 40N | 30 | 38 | 7 | — | 92.5 | 101 | 82 |
| 48 | Presence | Third anode wound portion | 1 | 40P | 30 | 38 | 7 | 58 | 92.5 | 101 | 82 |
| 49 | | | 1 | 40Q | 30 | 38 | 7 | — | 92.5 | 101 | 82 |
| 50 | Presence | Fourth anode wound portion | 1 | 40J | 30 | 38 | 7 | — | 92.5 | 101 | 82 |
| 51 | | | 1 | 40K | 30 | 38 | 7 | — | 92.5 | 101 | 82 |

TABLE 4

| Experimental Example | Step reducing tape ||||||||||| Capacity retention rate (%) |
| --- | --- | --- | --- | --- | --- | --- | --- | --- | --- | --- | --- |
| | Presence or absence | Attachment position | Number of attachment | Kind | Thickness (μm) | Ratio T (%) | Width (mm) | Ratio W (%) | Height (mm) | Ratio H (%) | |
| 52 | Presence | Second cathode wound portion | 1 | 40R | 30 | 38 | 7 | — | 92.0 | 102 | 82 |
| 53 | Presence | | 1 | 40S | 30 | 38 | 7 | — | 92.0 | 102 | 82 |
| 54 | Presence | First anode wound portion | 2 | 40E + 40G | 30 | 38 | 7 | 58 | 92.0 | 101 | 89 |
| 55 | Presence | | 2 | 40G + 40I | 30 | 38 | 7 | 58 | 92.0 | 101 | 89 |
| 56 | Presence | | 3 | 40E + 40G + 40I | 30 | 38 | 7 | 58 | 92.0 | 101 | 90 |
| 57 | Presence | First anode wound portion + First cathode wound portion | 6 | 40B + 40D + 40E + 40G + 40H + 40I | 30 + 30 | 38 + 38 | 7 + 7 | 58 + 58 | 92.0 + 92.0 | 101 + 102 | 88 |
| 58 | Presence | First anode wound portion + First cathode wound portion + Fourth anode wound portion | 9 | 40A + 40B + 40C + 40D + 40E + 40G + 40J + 40K + 40I | 30 + 30 + 30 | 38 + 38 + 38 | 7 + 7 + 7 | 58 + 587 + 58 | 92.0 + 92.0 + 92.0 | 101 + 102 + 101 | 88 |
| 59 | Absence | — | — | — | — | — | — | — | — | — | 71 |

As shown in Tables 1 to 4, when the step reducing tape 40 (Experiment Examples 1 to 58) was used, the capacity retention rate increased as compared with the case where the step reducing tape 40 was not used (Experimental Example 59).

In particular, when the step reducing tape 40 was used, the following tendency was obtained. First, as the number of step reducing tapes 40 increased, the capacity retention rate further increased. Second, when the ratio T was 15% to 80%, the capacity retention rate further increased. Third, when the ratio W was 50% to 90%, the capacity retention rate further increased. Fourth, when the ratio H was 20% to 105%, the capacity retention rate further increased.

According to the results shown in Tables 1 to 4, when the step reducing tape 40 was attached to one or both of the cathode 10 (first cathode wound portion 10X) and the anode 20 (first anode wound portion 20X) in one or more of the first region R1, the second region R2, and the third region R3, the cycle characteristics were improved. As a result, the secondary battery obtained excellent battery characteristics.

While being described above with reference to the embodiment and the examples, the present technology is not limited to the aspects described in the embodiment and the examples, and thus various modifications are available.

Specifically, while the secondary battery (lithium ion secondary battery) capable of obtaining battery capacity by using an occlusion phenomenon of lithium and a releasing phenomenon of lithium is described, the present technology is not limited to this. The present technology may be applied to a secondary battery (lithium metal secondary battery) capable of obtaining battery capacity by using a deposition phenomenon of lithium and a dissolution phenomenon of lithium, for example. Alternatively, the present technology may be applied to a secondary battery in which capacity of an anode material capable of occluding and releasing lithium is reduced to less than capacity of a cathode to express battery capacity by a total of capacity using an occlusion phenomenon of lithium and a releasing phenomenon of lithium, and capacity using a deposition phenomenon of lithium and a dissolution phenomenon of lithium, for example.

While a secondary battery of a laminate film type is described, the present technology is not limited to this. The present technology may be applied to a square secondary battery in which a wound electrode body having a flat shape is housed in a flat battery can, for example.

In addition, while the case where lithium is used as an electrode reactant is described, the present technology is not limited to this. The electrode reactant may be other group 1 element in the long period periodic table such as sodium or potassium, a group 2 element in the long period periodic table such as magnesium or calcium, or other light-weight metals such as aluminum, for example. In addition, the electrode reactant may be an alloy containing any one or more kinds of the above-mentioned series of elements.

The effects described in this specification are merely examples, and are not limited, and thus other effects may be achieved.

The present technology is described below in further detail according to an embodiment.

(1)
A secondary battery including:
a cathode terminal;
an anode terminal;
a wound electrode body; and
at least one step reducing member,
in which
in wound electrode body,
(A) a cathode and an anode are provided that are laminated to each other with a separator interposed between the cathode and the anode while being wound around a winding axis;
(B) a section intersecting with the winding axis has a flat shape defined by a major axis and a minor axis;
(C) the cathode includes a cathode current collector and a cathode active material layer provided on a part of the cathode current collector;
(D) the anode includes an anode current collector and an anode active material layer provided on a part of the anode current collector;
(E) the cathode is provided in its end portion on a wound inner side in a wound direction with a first cathode wound portion that extends in a major axis direction and that has the cathode terminal attached; and
(F) the anode is provided in its end portion on a wound inner side in a wound direction with a first anode wound portion that extends in the major axis direction while facing the first cathode wound portion across the separator and that has the anode terminal attached so as not to overlap with the cathode terminal in the minor axis direction, and
the at least one step reducing member is attached to at least one of the first cathode wound portion and the first anode wound portion, in at least one of a first region in the major axis direction, outside the cathode terminal in a wound direction of the cathode, a second region in the major axis direction, outside the anode terminal in a wound direction of the anode, and a third region between the cathode terminal and the anode terminal.

(2)
The secondary battery according to (1) above, in which
the step reducing member is attached to at least one of an inner peripheral side and an outer peripheral side of the first cathode wound portion, and
the step reducing member is attached to at least one of an inner peripheral side and an outer peripheral side of the first anode wound portion.

(3)
The secondary battery according to (1) or (2) above, in which
the cathode current collector of the first cathode wound portion includes a first cathode exposed portion in which the cathode active material layer is not provided, and
the step reducing member is attached to the first cathode exposed portion.

(4)
The secondary battery according to (3) above, in which
a cathode terminal protective member is attached to the first cathode exposed portion so as to cover the cathode terminal and a periphery of the cathode terminal, and
the step reducing member is attached onto the cathode terminal protective member.

(5)
The secondary battery according to any one of (1) to (4) above, in which
the anode current collector of the first anode wound portion includes a first anode exposed portion in which the anode active material layer is not provided, and
the step reducing member is attached to the first anode exposed portion.

(6)
The secondary battery according to (5) above, in which
an anode terminal protective member is attached to the first anode exposed portion so as to cover the anode terminal and a periphery of the anode terminal, and
the step reducing member is attached onto the anode terminal protective member.

(7)
The secondary battery according to any one of (1) to (6) above, in which
the cathode further includes a second cathode wound portion that is disposed outside the first cathode wound portion in the wound direction of the cathode and extends in the major axis direction while facing the first cathode wound portion across the separator,
the cathode current collector of the second cathode wound portion includes a second cathode exposed portion without being provided with the cathode active material layer in at least one of the first region, the second region, and the third region, and
the step reducing member is attached to the second cathode exposed portion.

(8)
The secondary battery according to any one of (1) to (7) above, in which
the anode further includes a second anode wound portion that is disposed outside the first anode wound portion in the wound direction of the anode and extends in the major axis direction while facing the first anode wound portion across the separator,
the anode current collector of the second anode wound portion includes a second anode exposed portion without being provided with the anode active material layer in at least one of the first region, the second region, and the third region, and the step reducing member is attached to the second anode exposed portion.

(9)

The secondary battery according to (8) above, in which
the anode further includes a third anode wound portion that is disposed outside the second anode wound portion in the wound direction of the anode and extends in the major axis direction while facing the second anode wound portion across the separator, the anode current collector of the third anode wound portion includes a third anode exposed portion without being provided with the anode active material layer in at least one of the first region, the second region, and the third region, and the step reducing member is attached to the third anode exposed portion.

(10)

The secondary battery according to any one of (1) to (9) above, in which the anode further includes a fourth anode wound portion that is disposed inside the first anode wound portion in the wound direction of the anode and extends in the major axis direction while facing the first anode wound portion across the separator, the anode current collector of the fourth anode wound portion includes a fourth anode exposed portion without being provided with the anode active material layer in at least one of the first region, the second region, and the third region, and the step reducing member is attached to the fourth anode exposed portion.

(11)

The secondary battery according to any one of (1) to (10) above, in which a ratio of a thickness of the step reducing member to a thickness of each of the cathode terminal and the anode terminal is 15% or more and 80% or less.

(12)

The secondary battery according to any one of (1) to (11) above, in which the step reducing member is disposed in the third region, and a ratio of a width of the step reducing member to a distance between the cathode terminal and the anode terminal is 50% or more and 90% or less.

(13)

The secondary battery according to any one of (1) to (12) above, in which a ratio of a height of the step reducing member to a height of each of the cathode current collector and the anode current collector is 20% or more and 105% or less.

(14)

The secondary battery according to any one of (1) to (13) above, in which the step reducing member includes at least one of polypropylene, polyethylene terephthalate and polyimide.

(15)

The secondary battery according to any one of (1) to (14) above, which is a lithium ion secondary battery.

(16)

A battery pack including:

the secondary battery according to any one of (1) to (15) above;

a control unit that controls operation of the secondary battery; and a switch unit that switches the operation of the secondary battery according to an instruction from the control unit.

(17)

An electric vehicle including:

the secondary battery according to any one of (1) to (15) above;

a converting unit that converts electric power supplied from the secondary battery into a driving force;

a driving unit that drives in accordance with the driving force; and a control unit that controls operation of the secondary battery.

(18)

An electric power storage system including:

the secondary battery according to any one of (1) to (15) above;

at least one electric apparatus to which electric power is supplied from the secondary battery; and a control unit that controls power supply from the secondary battery to the electric apparatus.

(19)

An electric tool including:

the secondary battery according to any one of (1) to (15) above; and a movable part to which power is supplied from the secondary battery.

(20)

An electronic apparatus including the secondary battery according to any one of (1) to (15) above as a power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A secondary battery comprising:
a cathode terminal;
an anode terminal;
a wound electrode body; and
a step reducing member,
wherein
in the wound electrode body,
a cathode and an anode are provided with a separator interposed between the cathode and the anode while being wound around a winding axis;
a section intersecting with the winding axis has a flat shape defined by a major axis and a minor axis;
the cathode includes a cathode current collector and a cathode active material layer provided on a part of the cathode current collector;
the anode includes an anode current collector and an anode active material layer provided on a part of the anode current collector;
the cathode includes an end portion on a wound inner side in a wound direction with a first cathode wound portion that extends in a major axis direction and the cathode terminal is attached to the end portion of the cathode; and
the anode includes an end portion on the wound inner side in the wound direction with a first anode wound portion that extends in the major axis direction while facing the first cathode wound portion across the separator, and the anode terminal is attached to the end portion of the anode and the anode terminal does not overlap with the cathode terminal in a minor axis direction, wherein the step reducing member is attached to one or both of the first cathode wound portion and the first anode wound portion in one or more of a first region, a second region and a third region, wherein the first region is in the major axis direction outside the cathode terminal in the wound direction of the cathode, and the second region is in the major axis direction outside the anode terminal in the wound direction of the anode and the third region between the cathode terminal and the anode terminal, wherein the cathode current collector of the first cathode wound portion includes a first cathode exposed portion in which the cathode active material layer is not provided, and the step reducing member is attached to the first cathode exposed portion, and wherein a cathode terminal protective member is attached to the first cathode exposed portion and covers the cathode terminal and a periphery of the cathode terminal, and the step reducing member is attached on the cathode terminal protective member.

2. The secondary battery according to claim 1, wherein
the step reducing member is attached to one or both of an inner peripheral side and an outer peripheral side of the first cathode wound portion, and
the step reducing member is attached to one or both of an inner peripheral side and an outer peripheral side of the first anode wound portion.

3. The secondary battery according to claim 1, wherein
the anode current collector of the first anode wound portion includes a first anode exposed portion in which the anode active material layer is not provided, and
the step reducing member is attached to the first anode exposed portion.

4. The secondary battery according to claim 3, wherein
an anode terminal protective member is attached to the first anode exposed portion and covers the anode terminal and a periphery of the anode terminal, and
the step reducing member is attached on the anode terminal protective member.

5. The secondary battery according to claim 1, wherein
the cathode further includes a second cathode wound portion that is disposed outside the first cathode wound portion in the wound direction of the cathode and extends in the major axis direction while facing the first cathode wound portion across the separator,
the cathode current collector of the second cathode wound portion includes a second cathode exposed portion without the cathode active material layer in one or more of the first region, the second region, and the third region, and
the step reducing member is attached to the second cathode exposed portion.

6. The secondary battery according to claim 1, wherein
the anode further includes a second anode wound portion that is disposed outside the first anode wound portion in the wound direction of the anode and extends in the major axis direction while facing the first anode wound portion across the separator,
the anode current collector of the second anode wound portion includes a second anode exposed portion without the anode active material layer in one or more of the first region, the second region, and the third region, and
the step reducing member is attached to the second anode exposed portion.

7. The secondary battery according to claim 6, wherein
the anode further includes a third anode wound portion that is disposed outside the second anode wound portion in the wound direction of the anode and extends in the major axis direction while facing the second anode wound portion across the separator,
the anode current collector of the third anode wound portion includes a third anode exposed portion without the anode active material layer in one or more of the first region, the second region, and the third region, and
the step reducing member is attached to the third anode exposed portion.

8. The secondary battery according to claim 1, wherein
the anode further includes a fourth anode wound portion that is disposed inside the first anode wound portion in the wound direction of the anode and extends in the major axis direction while facing the first anode wound portion across the separator,
the anode current collector of the fourth anode wound portion includes a fourth anode exposed portion without the anode active material layer in one or more of the first region, the second region, and the third region, and
the step reducing member is attached to the fourth anode exposed portion.

9. The secondary battery according to claim 1, wherein a ratio of a thickness of the step reducing member to a thickness of each of the cathode terminal and the anode terminal is 15% or more and 80% or less.

10. The secondary battery according to claim 1, wherein
the step reducing member is disposed in the third region, and
a ratio of a width of the step reducing member to a distance between the cathode terminal and the anode terminal is 50% or more and 90% or less.

11. The secondary battery according to claim 1, wherein a ratio of a height of the step reducing member to a height of each of the cathode current collector and the anode current collector is 20% or more and 105% or less.

12. The secondary battery according to claim 1, wherein the step reducing member includes one or more of polypropylene, polyethylene terephthalate and polyimide.

13. The secondary battery according to claim 1, wherein the secondary battery includes a lithium ion secondary battery.

14. A battery pack comprising:
the secondary battery according to claim 1;
a controller configured to control operation of the secondary battery; and
a switch configured to switch the operation of the secondary battery according to an instruction from the controller.

15. An electric vehicle comprising:
the secondary battery according to claim 1;
a converter configured to convert electric power supplied from the secondary battery into a driving force;
a driver configured to drive in accordance with the driving force; and
a controller configured to control operation of the secondary battery.

16. An electric power storage system comprising:
the secondary battery according to claim 1;
at least one electric apparatus to which electric power is configured to be supplied from the secondary battery; and
a controller configured to control power supply from the secondary battery to the electric apparatus.

17. An electric tool comprising:
the secondary battery according to claim 1; and
a movable part to which power is configured to be supplied from the secondary battery.

18. An electronic apparatus comprising the secondary battery according to claim 1 as a power supply source.

19. A secondary battery comprising:
a cathode terminal;
an anode terminal;
a wound electrode body; and
a step reducing member,
wherein
in the wound electrode body,
- a cathode and an anode are provided with a separator interposed between the cathode and the anode while being wound around a winding axis;
- a section intersecting with the winding axis has a flat shape defined by a major axis and a minor axis;
- the cathode includes a cathode current collector and a cathode active material layer provided on a part of the cathode current collector;
- the anode includes an anode current collector and an anode active material layer provided on a part of the anode current collector;
- the cathode includes an end portion on a wound inner side in a wound direction with a first cathode wound portion that extends in a major axis direction and the cathode terminal is attached to the end portion of the cathode; and
- the anode includes an end portion on the wound inner side in the wound direction with a first anode wound portion that extends in the major axis direction while facing the first cathode wound portion across the separator, and the anode terminal is attached to the end portion of the anode and the anode terminal does not overlap with the cathode terminal in a minor axis direction, wherein the step reducing member is attached to one or both of the first cathode wound portion and the first anode wound portion in one or more of a first region, a second region and a third region,
wherein the first region is in the major axis direction outside the cathode terminal in the wound direction of the cathode, and the second region is in the major axis direction outside the anode terminal in the wound direction of the anode and the third region between the cathode terminal and the anode terminal,
wherein the anode current collector of the first anode wound portion includes a first anode exposed portion in which the anode active material layer is not provided, and the step reducing member is attached to the first anode exposed portion, and
wherein an anode terminal protective member is attached to the first anode exposed portion and covers the anode terminal and a periphery of the anode terminal, and the step reducing member is attached on the anode terminal protective member.

20. The secondary battery according to claim 19, wherein
the step reducing member is attached to one or both of an inner peripheral side and an outer peripheral side of the first cathode wound portion, and
the step reducing member is attached to one or both of an inner peripheral side and an outer peripheral side of the first anode wound portion.

21. The secondary battery according to claim 19, wherein
the cathode current collector of the first cathode wound portion includes a first cathode exposed portion in which the cathode active material layer is not provided, and
the step reducing member is attached to the first cathode exposed portion.

22. The secondary battery according to claim 19, wherein
the cathode further includes a second cathode wound portion that is disposed outside the first cathode wound portion in the wound direction of the cathode and extends in the major axis direction while facing the first cathode wound portion across the separator,
the cathode current collector of the second cathode wound portion includes a second cathode exposed portion without the cathode active material layer in one or more of the first region, the second region, and the third region, and
the step reducing member is attached to the second cathode exposed portion.

23. The secondary battery according to claim 19, wherein
the anode further includes a second anode wound portion that is disposed outside the first anode wound portion in the wound direction of the anode and extends in the major axis direction while facing the first anode wound portion across the separator,
the anode current collector of the second anode wound portion includes a second anode exposed portion without the anode active material layer in one or more of the first region, the second region, and the third region, and
the step reducing member is attached to the second anode exposed portion.

24. The secondary battery according to claim 23, wherein
the anode further includes a third anode wound portion that is disposed outside the second anode wound portion in the wound direction of the anode and extends in the major axis direction while facing the second anode wound portion across the separator,
the anode current collector of the third anode wound portion includes a third anode exposed portion without the anode active material layer in one or more of the first region, the second region, and the third region, and
the step reducing member is attached to the third anode exposed portion.

25. The secondary battery according to claim 19, wherein
the anode further includes a fourth anode wound portion that is disposed inside the first anode wound portion in the wound direction of the anode and extends in the major axis direction while facing the first anode wound portion across the separator,
the anode current collector of the fourth anode wound portion includes a fourth anode exposed portion without the anode active material layer in one or more of the first region, the second region, and the third region, and
the step reducing member is attached to the fourth anode exposed portion.

26. The secondary battery according to claim 19, wherein a ratio of a thickness of the step reducing member to a thickness of each of the cathode terminal and the anode terminal is 15% or more and 80% or less.

27. The secondary battery according to claim 19, wherein
the step reducing member is disposed in the third region, and
a ratio of a width of the step reducing member to a distance between the cathode terminal and the anode terminal is 50% or more and 90% or less.

28. The secondary battery according to claim 19, wherein a ratio of a height of the step reducing member to a height of each of the cathode current collector and the anode current collector is 20% or more and 105% or less.

29. The secondary battery according to claim 19, wherein the step reducing member includes one or more of polypropylene, polyethylene terephthalate and polyimide.

30. The secondary battery according to claim 19, wherein the secondary battery includes a lithium ion secondary battery.

31. A battery pack comprising:
the secondary battery according to claim 19;
a controller configured to control operation of the secondary battery; and
a switch configured to switch the operation of the secondary battery according to an instruction from the controller.

32. An electric vehicle comprising:
the secondary battery according to claim 19;
a converter configured to convert electric power supplied from the secondary battery into a driving force;
a driver configured to drive in accordance with the driving force; and
a controller configured to control operation of the secondary battery.

33. An electric power storage system comprising:
the secondary battery according to claim 19;
at least one electric apparatus to which electric power is configured to be supplied from the secondary battery; and
a controller configured to control power supply from the secondary battery to the electric apparatus.

34. An electric tool comprising:
the secondary battery according to claim 19; and
a movable part to which power is configured to be supplied from the secondary battery.

35. An electronic apparatus comprising the secondary battery according to claim 19 as a power supply source.

* * * * *